United States Patent
Ko et al.

(10) Patent No.: US 8,982,978 B2
(45) Date of Patent: Mar. 17, 2015

(54) METHOD AND APPARATUS FOR TRANSCEIVING A PRECODED SIGNAL IN A MULTIPLE ANTENNA SUPPORTED WIRELESS COMMUNICATION SYSTEM

(75) Inventors: Hyunsoo Ko, Anyang-si (KR); Jaehoon Chung, Anyang-si (KR); Moonil Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 80 days.

(21) Appl. No.: 13/814,493

(22) PCT Filed: Aug. 23, 2011

(86) PCT No.: PCT/KR2011/006224
§ 371 (c)(1),
(2), (4) Date: Feb. 5, 2013

(87) PCT Pub. No.: WO2012/026742
PCT Pub. Date: Mar. 1, 2012

(65) Prior Publication Data
US 2013/0129018 A1    May 23, 2013

Related U.S. Application Data

(60) Provisional application No. 61/375,883, filed on Aug. 23, 2010.

(51) Int. Cl.
*H04B 7/02* (2006.01)
*H04L 25/02* (2006.01)
(Continued)

(52) U.S. Cl.
CPC .............. *H04L 25/02* (2013.01); *H04B 7/0478* (2013.01); *H04L 5/0023* (2013.01); *H04L 5/0048* (2013.01); *H04B 7/065* (2013.01); *H04L 5/001* (2013.01); *H04B 7/0639* (2013.01); *H04B 7/0486* (2013.01); *H04B 7/0465* (2013.01)
USPC ........... 375/267; 375/260; 375/299; 375/347; 375/349

(58) Field of Classification Search
USPC .......................... 375/267, 260, 299, 347, 349
See application file for complete search history.

(56) References Cited

U.S. PATENT DOCUMENTS

2009/0046569 A1* 2/2009 Chen et al. .................... 370/203

OTHER PUBLICATIONS

PCT International Application No. PCT/KR2011/006224, Written Opinion of the International Searching Authority dated Mar. 13, 2012, 21 pages.

(Continued)

*Primary Examiner* — Kabir A Timory
(74) *Attorney, Agent, or Firm* — Lee, Hong, Degerman, Kang & Waimey

(57) ABSTRACT

The present invention relates to a method for transmitting a signal from a transmitter to a receiver through N number of transmitting antennas (where N≥2), comprising: selecting a first and a second matrix from a first and a second codebook related to a first and a second precoding matrix indicator (PMI), respectively, and determining a precoding matrix on the basis of the first and second matrix; performing precoding by using the determined precoding matrix for L number of layers (where 1≤L≤N) to which a signal to be transmitted to the receiver is mapped; and transmitting the precoded signal to the receiver through the N number of transmitting antennas. Here, the first codebook includes one or more diagonal matrices having an N×N size, non-zero elements in the diagonal matrix has a predetermined phase value, and the second codebook includes one or more matrices having an N×L size.

14 Claims, 24 Drawing Sheets

(51) Int. Cl.
  *H04B 7/04* (2006.01)
  *H04L 5/00* (2006.01)
  *H04B 7/06* (2006.01)

(56) References Cited

OTHER PUBLICATIONS

Nokia, et al., "Double codebook design principles", R1-103804, 3GPP TSG-RAN WG1 Meeting #61bis, Jun. 2010, 9 pages.

LG Electronics, "Consideration on feedback design for LTE-A", R1-102724, 3GPP TSG RAN WG1 Meeting #61, May 2010, 4 pages.

Nokia, et al., "Double codebook performance evaluation", R1-103805, 3GPP TSG-RAN WG1 Meeting #61bis, Jun. 2010, 10 pages.

PCT International Application No. PCT/KR2011/006224, Written Opinion of the International Searching Authority dated Mar. 13, 2012, 10 pages.

* cited by examiner

FIG. 13
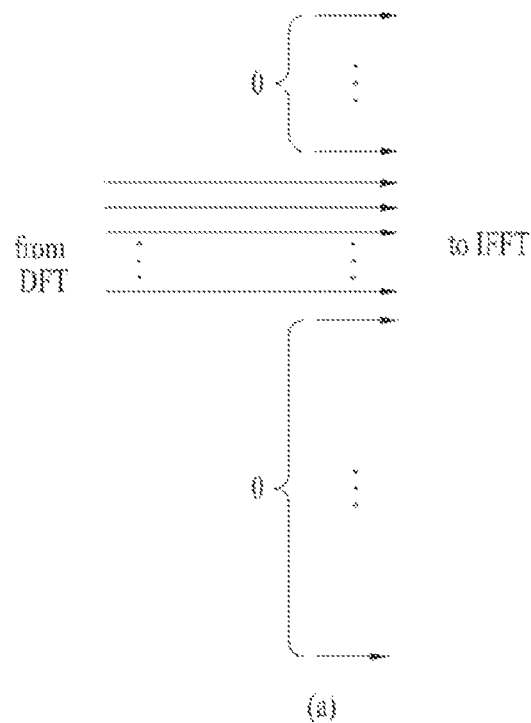
(a)
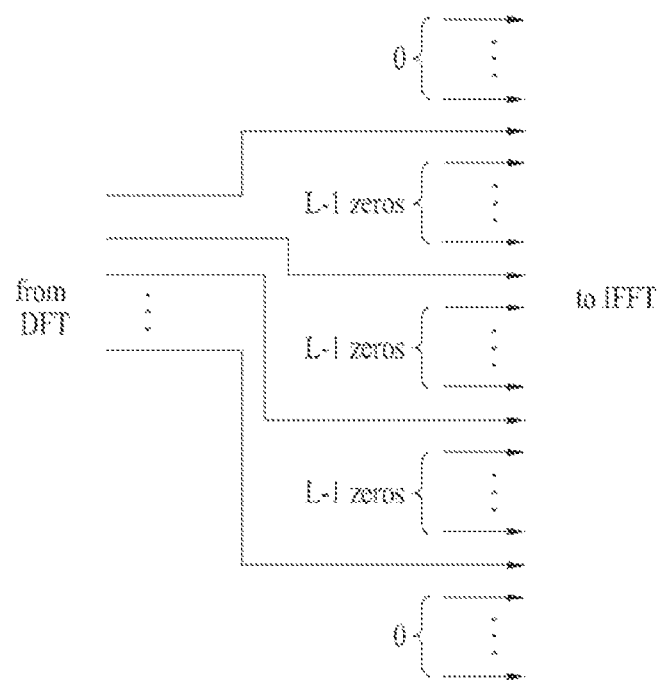
(b)

FIG. 15
(a)
(b)

US 8,982,978 B2

METHOD AND APPARATUS FOR TRANSCEIVING A PRECODED SIGNAL IN A MULTIPLE ANTENNA SUPPORTED WIRELESS COMMUNICATION SYSTEM

CROSS-REFERENCE TO RELATED APPLICATIONS

This application is the National Stage filing under 35 U.S.C. 371 of International Application No. PCT/KR2011/006224, filed on Aug. 23, 2011, which claims the benefit of U.S. Provisional Application Ser. No. 61/375,883, filed on Aug. 23, 2010, the contents of which are all hereby incorporated by reference herein in their entirety.

TECHNICAL FIELD

The present invention relates to wireless communication systems, and more particularly, to a method and apparatus for transmitting and receiving a precoded signal in a wireless communication system supporting multiple antennas.

BACKGROUND ART

A Multi-Input Multi-Output (MIMO) technique refers to a method capable of improving data transmission/reception efficiency using multiple transmit antennas and multiple receive antennas, instead of one transmit antenna and one receive antenna used up to now. Namely, MIMO is technology for increasing capacity or improving performance using multiple antennas at a transmitting end or receiving end of a wireless communication system. MIMO may also be called multiantenna technology.

To support MIMO transmission, precoding to appropriately distribute transmission information to respective antennas according to a channel state, etc. may be applied. Precoding may refer to mapping one or more layers to a plurality of antenna and such a mapping relationship may be expressed by a precoding matrix. A set of precoding matrices which can be used by the transmitting end for MIMO transmission may be predefined and shared among the transmitting end and the receiving end. This set of precoding matrices is referred to as a precoding codebook or simply a codebook.

In a legacy 3rd Generation Partnership Project (3GPP) Long Term Evolution (LTE) system, a maximum of four transmit (4Tx) antennas is supported for downlink transmission and 2Tx antennas and a codebook for transmission of 2Tx antennas are defined.

DETAILED DESCRIPTION OF THE INVENTION

Technical Problems

In a legacy 3GPP LTE system (e.g. a system conforming to 3GPP LTE release-8 or release-9 standard), a codebook for supporting up to 4Tx antennas in downlink has been designed. In a 3GPP LTE-A system which is an evolved version of the legacy 3GPP LTE system, introduction of an extended antenna configuration has been considered and support of a maximum of 8Tx antennas in downlink has been discussed, in order to achieve improved performance (e.g. improved spectral efficiency). For transmission of 8Tx antennas to provide high throughput, a closed-loop MIMO scheme in which a receiving end feeds back channel information to a transmitting end may be used. Here, it is considered to apply a closed-loop MIMO scheme based on a predefined codebook to reduce channel information feedback overhead. Accordingly, a precoding codebook for providing excellent performance for downlink transmission through up to 8Tx antennas needs to be designed. In an LTE-A system, it is discussed to apply MIMO transmission even in uplink and support transmission of a maximum of 4Tx antennas.

In a system supporting an extended antenna configuration (e.g. an LTE-A system), a Multiple User (MU)-MIMO scheme is considered to acquire additional diversity. In the MU-MIMO scheme, since channel interference between User Equipments (UEs) multiplexed in an antenna domain exists, when a Base Station (BS) performs downlink transmission using channel state information which is fed back by one of a plurality of UEs participating in MU-MIMO, it is necessary not to generate interference with respect to the other UEs. Accordingly, to correctly perform a MIMO operation, channel station information of higher accuracy should be fed back as compared with a Single User (SU)-MIMO scheme.

It is a technical object of the present invention to provide a codebook design method capable of efficiently supporting MIMO transmission and a method and apparatus for transmitting and receiving a precoded signal.

It will be appreciated by persons skilled in the art that that the technical objects that can be achieved through the present invention are not limited to what has been particularly described hereinabove and other technical objects of the present invention will be more clearly understood from the following detailed description.

Technical Solutions

To achieve the above technical object, a method for transmitting a signal to a receiver through N (N≥2) transmission antennas in a transmitter according to an embodiment of the present invention include selecting a first matrix from a first codebook associated with a first Precoding Matrix Indicator (PMI), selecting a second matrix from a second codebook associated with a second PMI, and determining a precoding matrix based on the first and second matrices; performing precoding using the determined precoding matrix with respect to L (1≤L≤N) layers to which a signal to be transmitted to the receiver is mapped; and transmitting the precoded signal to the receiver through the N transmission antennas, wherein the first codebook includes one or more diagonal matrices each having N×N size, elements other than 0 in each of the diagonal matrices have prescribed phase values, and the second codebook includes one or more matrices each having N×L size.

To achieve the above technical object, a method for receiving a signal from a transmitter in a receiver according to another embodiment of the present invention includes receiving the signal transmitted through N (N≥2) transmission antennas of the transmitter; and processing the received signal, wherein the received signal is a signal upon which precoding has been performed using a precoding matrix with respect to L (1≤L≤N) layers to which a signal to be transmitted to the receiver from the transmitter is mapped, the precoding matrix is determined based on a first matrix selected from a first codebook associated with a first Precoding Matrix Indicator (PMI) and a second matrix selected from a second codebook associated with a second PMI, and the first codebook includes one or more diagonal matrices each having N×N size, elements other than 0 in each of the diagonal matrices have prescribed phase values, and the second codebook includes one or more matrices each having N×L size.

To achieve the above technical object, a transmitter for transmitting a precoded signal according to still another embodiment of the present invention includes a transmission module for transmitting a signal to a receiver; a reception module for receiving a signal from the receiver; a memory for storing first and second codebooks; N (N≥2) transmission antennas; and a processor for controlling the transmitter, wherein the processor is configured to select a first matrix from a first codebook associated with a first Precoding Matrix Indicator (PMI), select a second matrix from a second codebook associated with a second PMI, and determine a precoding matrix based on the first and second matrices, the processor is configured to perform precoding using the determined precoding matrix with respect to L (1≤L≤N) layers to which a signal to be transmitted to the receiver is mapped, and the processor is configured to transmit the precoded signal to the receiver through the transmission module via the N transmission antennas, and wherein the first codebook includes one or more diagonal matrices each having N×N size, elements other than 0 in each of the diagonal matrices have prescribed phase values, and the second codebook includes one or more matrices each having N×L size.

To achieve the above technical object, a receiver for receiving a precoded signal according to a further embodiment of the present invention includes a transmission module for transmitting a signal to a transmitter; a reception module for receiving a signal from the transmitter; a memory for storing first and second codebooks, one or more antennas; and a processor for controlling the receiver, wherein the processor is configured to receive a signal transmitted through N (N≥2) transmission antennas of the transmitter through the reception module and process the received signal, the received signal is a signal upon which precoding has been performed using a precoding matrix with respect to L (1≤L≤N) layers to which a signal to be transmitted to the receiver from the transmitter is mapped, the precoding matrix is determined based on a first matrix selected from a first codebook associated with a first Precoding Matrix Indicator (PMI) and a second matrix selected from a second codebook associated with a second PMI, and the first codebook includes one or more diagonal matrices each having N×N size, elements other than 0 in each of the diagonal matrices have prescribed phase values, and the second codebook includes one or more matrices each having N×L size.

The following may be commonly applied to the above embodiments of the present invention.

If the number L of the layers is a specific number or more, the first codebook may be composed of one diagonal matrix of an identity matrix and the specific number of the layers may be 2 or more.

The first codebook may include a plurality of diagonal matrices and one of the plurality of diagonal matrices may be an identity matrix.

Elements other than 0 of each of the diagonal matrices may be composed of one column vector of a prescribed matrix and the prescribed matrix may be one of an N-point Discrete Fourier Transform (DFT) matrix, a matrix included in a single codebook, and a matrix determined by a combination of multiple codebooks.

Each of the diagonal matrices may be determined by a product of a first diagonal matrix of N×N size and a second diagonal matrix of N×N size. Elements other than 0 of the first diagonal matrix are composed of one of one column vector of an N-point DFT matrix and a vector concatenating one column vector of an N/2-point DFT matrix. Elements other than 0 of the second diagonal matrix may be composed of one column vector of the N-point DFT matrix or a repetitive form of a prescribed phase value.

The above overall description and a later detailed description of the present invention are purely exemplary and given as an additional description of the present invention determined by the appended claims.

Advantageous Effects

According to the present invention, a codebook design method capable of efficiently supporting MIMO transmission can be provided and a method and apparatus for transmitting and receiving a precoded signal can be provided.

It will be appreciated by persons skilled in the art that that the effects that can be achieved through the present invention are not limited to what has been particularly described hereinabove and other advantages of the present invention will be more clearly understood from the following detailed description.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings:

FIG. 13 is a diagram explaining schemes of mapping DFT processed signals to signals in the frequency domain;

FIG. 15 is a diagram illustrating a symbol location to which an RS is mapped;

BEST MODE FOR CARRYING OUT THE INVENTION

Figure 1:
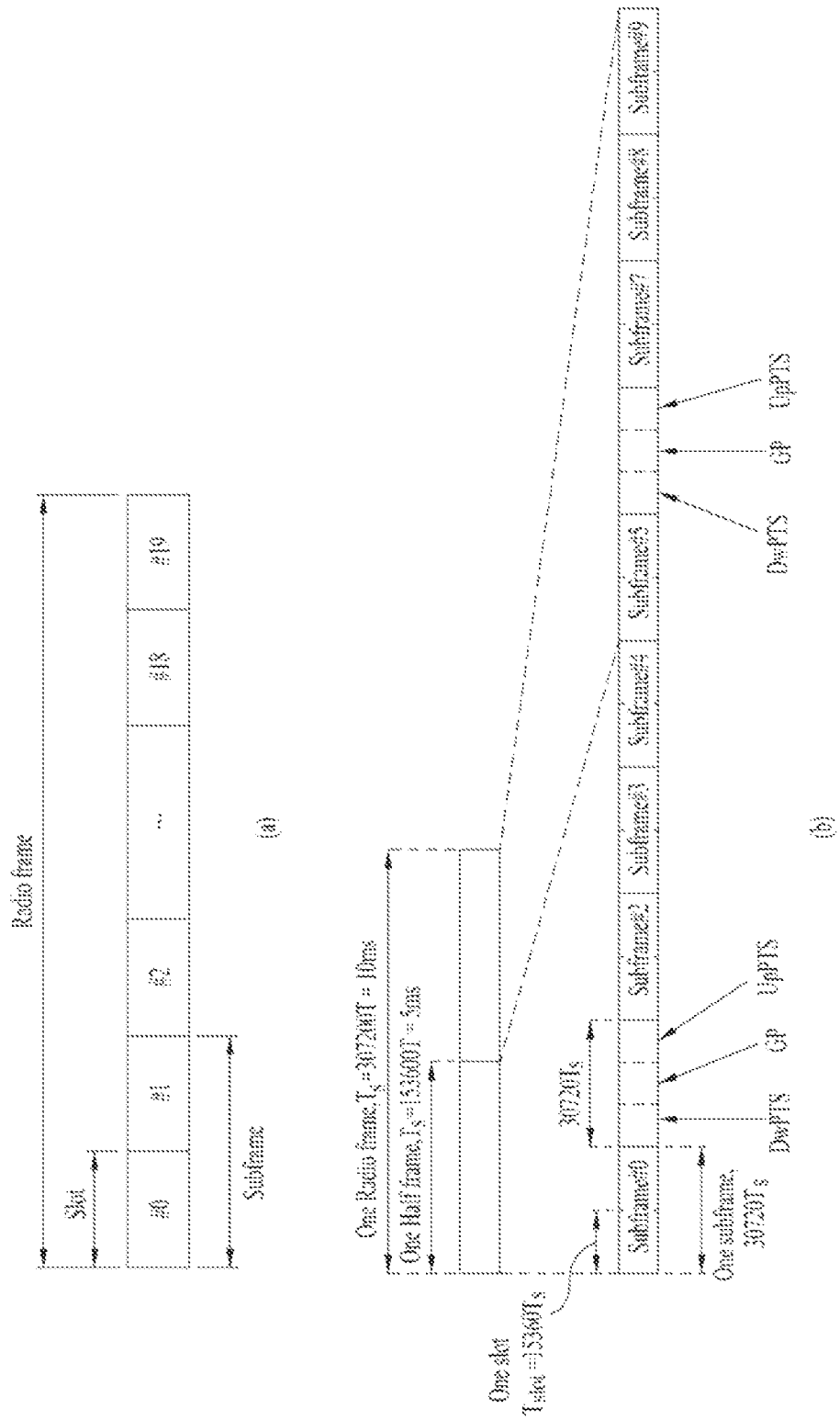
FIG. 1 is a diagram illustrating the structure of a downlink radio frame.

The embodiments of the present invention described hereinbelow are combinations of elements and features of the present invention in a predetermined manner. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment.

In the embodiments of the present invention, a description is given of a data transmission and reception relationship between a Base Station (BS) and a terminal. Here, the BS refers to a terminal node of a network communicating directly with the terminal. In some cases, a specific operation described as being performed by the BS may be performed by an upper node of the BS.

In other words, it is apparent that, in a network comprised of a plurality of network nodes including the BS, various operations performed for communication with a terminal may be performed by the BS, or network nodes other than the BS. The term 'BS' may be replaced with the term fixed station, Node B, eNode B (eNB), or Access Point (AP). Also, in the present document, the term BS may be used as a concept including a cell or a sector. Meanwhile, 'relay' may be replaced with the term Relay Node (RN) or Relay Station (RS). The term 'terminal' may be replaced with the term User Equipment (UE), Mobile Station (MS), Mobile Subscriber Station (MSS), or Subscriber Station (SS). In the present document, an uplink transmission entity may mean a terminal or a relay and an uplink reception entity may mean a BS or a relay. Similarly, a downlink transmission entity may mean a BS or a relay and a downlink reception entity may mean a terminal or a relay. In other words, uplink transmission may refer to transmission from a terminal to a BS, transmission from a terminal to a relay, or transmission from a relay to a BS. Similarly, downlink transmission may refer to transmission from a BS to a terminal, transmission from a BS to a relay, or transmission from a relay to a terminal.

Specific terms disclosed in the present invention are proposed to aid in understanding the present invention, and the use of these specific terms may be changed to another format within the technical scope or spirit of the present invention.

In some instances, well-known structures and devices may be omitted in order to avoid obscuring the concepts of the present invention and the important functions of the structures and devices may be shown in block diagram form. The same reference numbers will be used throughout the drawings to refer to the same or like parts.

The embodiments of the present invention can be supported by standard documents disclosed in at least one of wireless access systems including an Institute of Electrical and Electronics Engineers (IEEE) 802 system, a 3$^{rd}$ Generation Partnership Project (3GPP) system, a 3GPP Long Term Evolution (LTE) system, a 3GPP LTE-Advanced (LTE-A) system, and a 3GPP2 system. In particular, the steps or parts, which are not described to clearly reveal the technical idea of the present invention, in the embodiments of the present invention may be supported by the above documents. All terminology used herein may be supported by the abovementioned documents.

The following technique can be used for a variety of radio access systems, for example, Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), and the like. CDMA may be embodied through radio technology such as Universal Terrestrial Radio Access (UTRA) or CDMA2000. TDMA may be embodied through radio technology such as Global System for Mobile communications (GSM)/General Packet Radio Service (GPRS)/Enhanced Data Rates for GSM Evolution (EDGE). OFDMA may be embodied through radio technology such as Institute of Electrical and Electronics Engineers (IEEE) 802.11 (Wi-Fi), IEEE 802.16 (WiMAX), IEEE 802-20, and E-UTRA (Evolved UTRA). UTRA is a part of the Universal Mobile Telecommunications System (UMTS). 3GPP LTE is a part of the E-UMTS (Evolved UMTS), which uses E-UTRA. 3GPP LTE employs OFDMA in downlink and employs SC-FDMA in uplink. LTE-A is an evolved version of 3GPP LTE. WiMAX can be explained by an IEEE 802.16e (WirelessMAN-OFDMA Reference System) and an advanced IEEE 802.16m (WirelessMAN-OFDMA Advanced System). For clarity, the following description focuses on the 3GPP LTE and LTE-A systems. However, technical features of the present invention are not limited thereto.

The structure of a radio frame will now be described with reference to FIG. 1.

In a cellular OFDM radio packet communication system, uplink/downlink data packet transmission is performed in subframe units. One subframe is defined as a predetermined time interval including a plurality of OFDM symbols. The 3GPP LTE standard supports a type 1 radio frame structure applicable to Frequency Division Duplex (FDD) and a type 2 radio frame structure applicable to Time Division Duplex (TDD).

FIG. 1(a) is a diagram illustrating the structure of the type 1 radio frame. A downlink radio frame includes 10 subframes, and one subframe includes two slots. A time required to transmit one subframe is defined as a Transmission Time Interval (TTI). For example, one subframe may have a length of 1 ms and one slot may have a length of 0.5 ms. One slot may include a plurality of OFDM symbols in the time domain and include a plurality of Resource Blocks (RBs) in the frequency domain. Since a 3GPP LTE system adopts OFDMA in downlink, an OFDM symbol indicates one symbol interval. The OFDM symbol may be referred to as an SC-FDMA symbol or a symbol interval. An RB is a resource allocation unit including a plurality of contiguous subcarriers in a slot.

The number of OFDM symbols included in one slot may be changed according to the configuration of a CP. The CP includes an extended CP and a normal CP. For example, if the OFDM symbols are configured by the normal CP, the number of OFDM symbols included in one slot may be seven. If the OFDM symbols are configured by the extended CP, since the length of one OFDM symbol is increased, the number of OFDM symbols included in one slot is less than that of the case of the normal CP. In case of the extended CP, for example, the number of OFDM symbols included in one slot may be six. If a channel state is unstable, for example, if a UE moves at a high speed, the extended CP may be used in order to further reduce inter-symbol interference.

In case of using the normal CP, since one slot includes 7 OFDM symbols, one subframe includes 14 OFDM symbols. At this time, the first two or three OFDM symbols of each subframe may be allocated to a Physical Downlink Control Channel (PDCCH) and the remaining OFDM symbols may be allocated to a Physical Downlink Shared Channel (PD-SCH).

FIG. 1(b) is a diagram illustrating the structure of the type 2 radio frame. The type 2 radio frame includes two half frames, each of which includes five subframes, a Downlink Pilot Time Slot (DwPTS), a Guard Period (GP), and an Uplink Pilot Time Slot (UpPTS). One subframe includes two slots. DwPTS is used for initial cell search, synchronization, or channel estimation in a UE. UpPTS is used for channel estimation in a BS and uplink transmission synchronization of the UE. GP is located between uplink and downlink to remove interference generated in uplink due to multi-path delay of a downlink signal. Meanwhile, one subframe is composed of two slots irrespective of the radio frame type.

The structure of the radio frame is only exemplary. Accordingly, the number of subframes included in the radio frame, the number of slots included in the subframe, or the number of symbols included in the slot may be changed in various manners.

Figure 2:
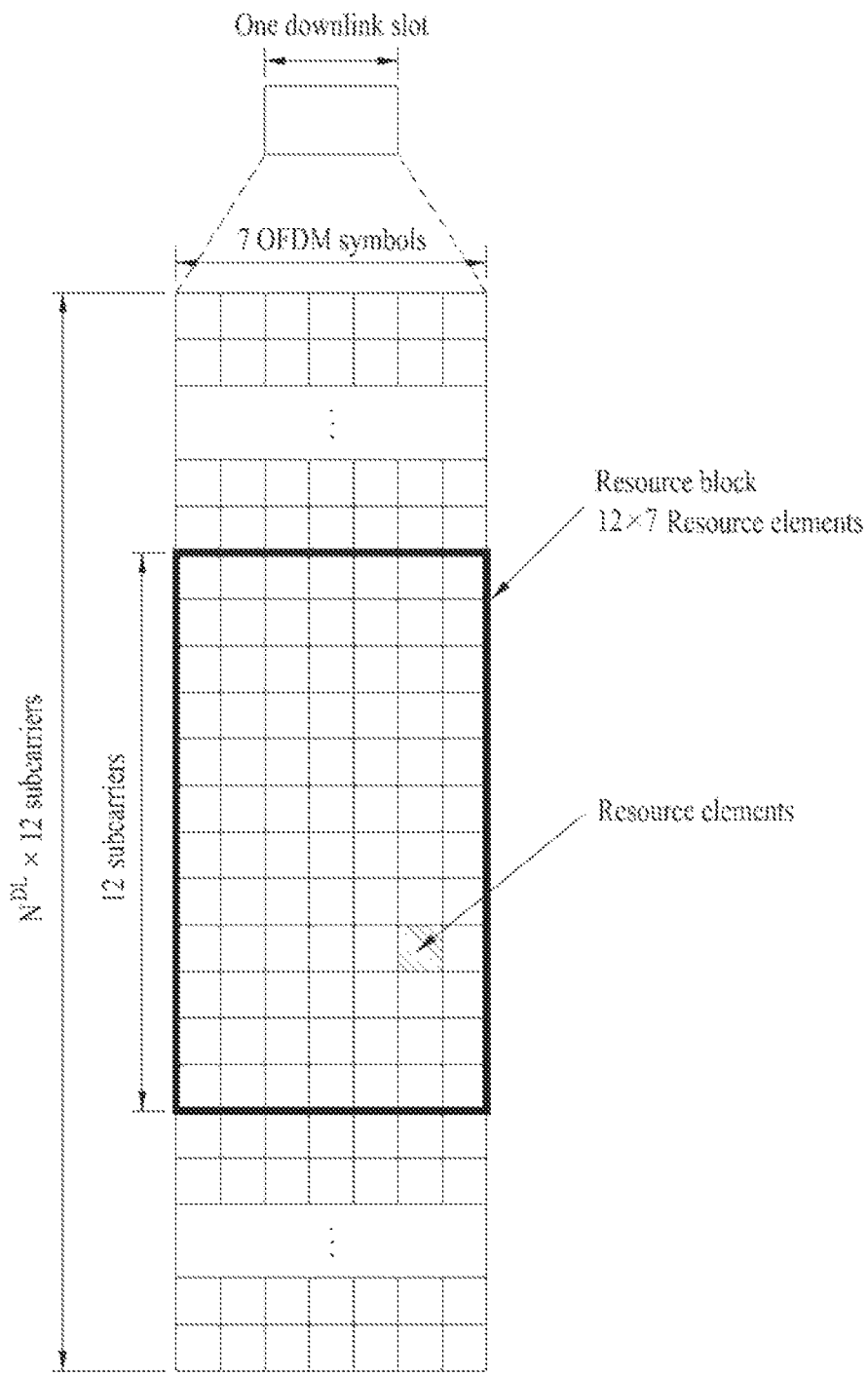
FIG. 2 is a diagram illustrating an exemplary resource grid for one downlink slot.

FIG. 2 is a diagram illustrating an exemplary resource grid for one downlink slot. In FIG. 2, OFDM symbols are configured by a normal CP. Referring to FIG. 2, a downlink slot includes a plurality of OFDM symbols in the time domain and a plurality of RBs in the frequency domain. Although one downlink slot includes 7 OFDM symbols and one RB includes 12 subcarriers in the figure, the numbers of OFDM symbols and subcarriers are not limited thereto. Each element on the resource grid is referred to as a Resource Element (RE). For example, an RE a(k,l) denotes an RE located in a k-th subcarrier and an 1-th OFDM symbol. In case of a normal CP, one RB includes 12×7 REs (in case of an extended CP, one RB includes 12×6 REs). Since each subcarrier spacing is 15 kHz, one RB includes about 180 kHz in the frequency domain. $N^{DL}$ denotes the number of RBs included in the downlink slot. A value of $N^{DL}$ may be determined based on a downlink transmission bandwidth which is configured by scheduling of a BS.

Figure 3:
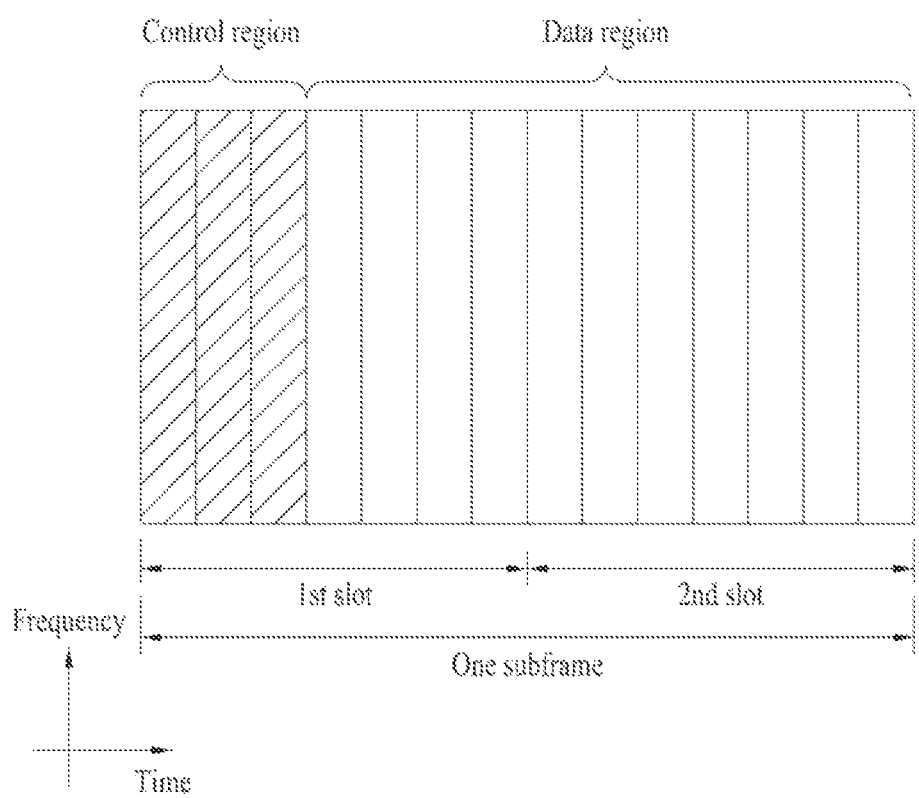
FIG. 3 is a diagram illustrating the structure of a downlink subframe.

FIG. 3 is a diagram illustrating the structure of a downlink subframe. A maximum of three OFDM symbols of a front portion of a first slot within one subframe corresponds to a control region to which a control channel is allocated. The remaining OFDM symbols correspond to a data region to which a Physical Downlink Shared Channel (PDSCH) is allocated. A basic transmission unit is one subframe. Namely, a PDCCH and a PDSCH are allocated over two slots. Examples of the downlink control channels used in the 3GPP LTE system include a Physical Control Format Indicator Channel (PCFICH), a Physical Downlink Control Channel (PDCCH), a Physical Hybrid automatic repeat request Indicator Channel (PHICH), etc. The PCFICH is transmitted on a first OFDM symbol of a subframe, and includes information about the number of OFDM symbols used to transmit the control channel in the subframe. The PHICH includes a HARQ ACK/NACK signal as a response to uplink transmission. The control information transmitted through the PDCCH is referred to as Downlink Control Information (DCI). The DCI includes uplink or downlink scheduling information or an uplink transmit power control command for a certain UE group. The PDCCH may include resource allocation and transmission format of a Downlink Shared Channel (DL-SCH), resource allocation information of an Uplink Shared Channel (UL-SCH), paging information of a Paging Channel (PCH), system information on the DL-SCH, resource allocation of a higher layer control message such as a random access response transmitted on the PDSCH, a set of transmit power control commands for individual UEs in a certain UE group, transmit power control information, activation of Voice over IP (VoIP), etc. A plurality of PDCCHs may be transmitted within the control region. The UE may monitor the plurality of PDCCHs. The PDCCHs are transmitted as an aggregate of one or several contiguous Control Channel Elements (CCEs). The CCE is a logical allocation unit used to provide the PDCCHs at a coding rate based on the state of a radio channel. The CCE corresponds to a plurality of RE groups. The format of the PDCCH and the number of available bits are determined based on a correlation between the number of CCEs and a coding rate provided by the CCEs. A BS determines a PDCCH format according to DCI transmitted to a UE, and attaches a Cyclic Redundancy Check (CRC) to control information. The CRC is masked with an identifier called a Radio Network Temporary Identifier (RNTI) according to an owner or usage of the PDCCH. If the PDCCH is for a specific UE, a Cell-RNTI (C-RNTI) of the UE may be masked to the CRC. Alternatively, if the PDCCH is for a paging message, a paging indicator identifier (P-RNTI) may be masked to the CRC. If the PDCCH is for system information (more specifically, a System Information Block (SIB)), a system information identifier and a System Information RNTI (SI-RNTI) may be masked to the CRC. To indicate a random access response that is a response for transmission of a random access preamble of a UE, a Random Access-RNTI (RA-RNTI) may be masked to the CRC.

Figure 4:
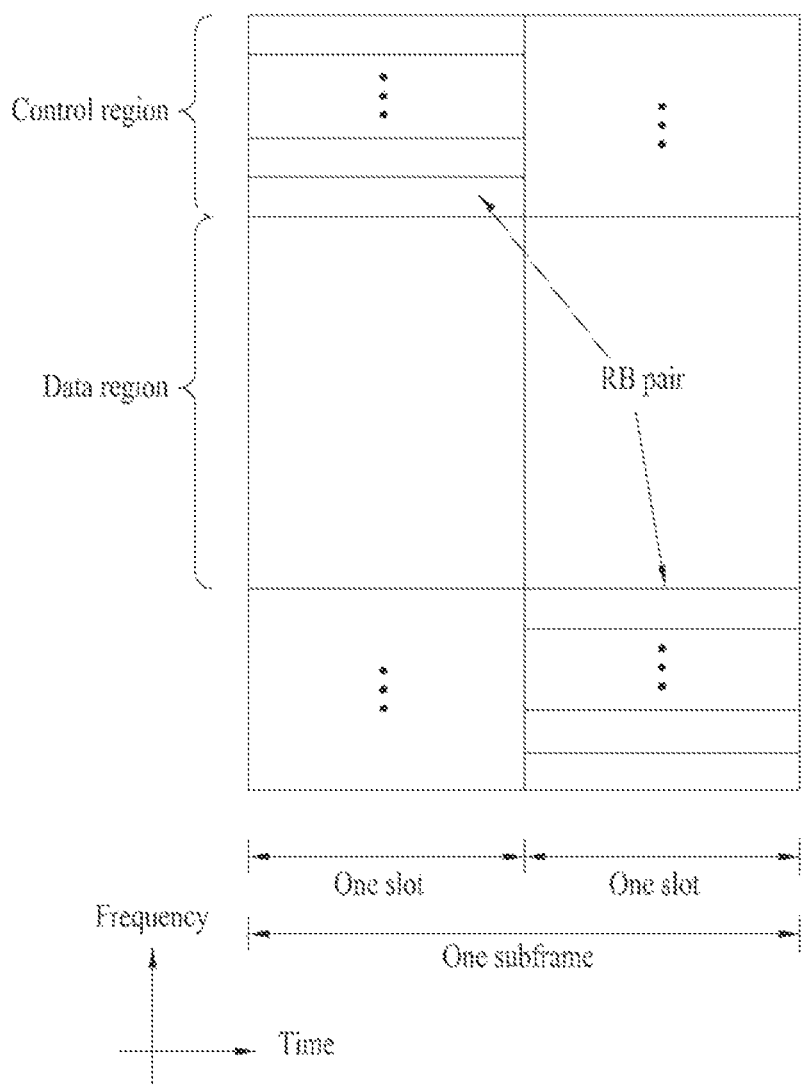
FIG. 4 is a diagram illustrating the structure of an uplink subframe.

FIG. 4 is a diagram illustrating the structure of an uplink frame. The uplink subframe may be divided into a control region and a data region in the frequency domain. A Physical Uplink Control Channel (PUCCH) including uplink control information is allocated to the control region. A Physical Uplink Shared Channel (PUSCH) including user data is allocated to the data region. To maintain single carrier property, one UE does not simultaneously transmit the PUCCH and the PUSCH. The PUCCH for one UE is allocated to an RB pair in a subframe. RBs belonging to the RB pair occupy different subcarriers over two slots. That is, the RB pair allocated to the PUCCH is frequency-hopped at a slot boundary.

Reference Signal

In a MIMO system, each transmit antenna has an independent data channel. A receiver may estimate a channel with respect to each transmit antenna to receive data transmitted from each transmit antenna based on the channel estimation. Channel estimation refers to a process of compensating for signal distortion caused by fading so as to restore the received signal. Fading refers to a phenomenon in which the intensity of a signal is rapidly changed due to multi-path time delay in a wireless communication system environment. For channel estimation, a reference signal known to both a transmitter and a receiver is necessary. The reference signal may be referred to simply as an RS or as a pilot signal according to the applied standard.

In a legacy LTE release-8 or release-9 system, a downlink RS transmitted by a BS is defined. The downlink RS is a pilot signal for coherent demodulation of channels such as a Physical Downlink Shared Channel (PDSCH), a Physical Control Format Indicator Channel (PCFICH), a Physical Hybrid Indicator Channel (PHICH), and a Physical Downlink Control Channel (PDCCH). The downlink RS includes a Common Reference Signal (CRS) shared among all UEs in a cell and a Dedicated Reference Signal (DRS) only for a specific UE.

The CRS may be referred to as a cell-specific RS. The DRS may be referred to as a UE-specific RS or a Demodulation Reference Signal (DMRS).

A method for allocating the downlink RS in the legacy 3GPP LTE system will now be described. A location of an RE at which an RS is transmitted, (i.e. an RS pattern), will be described based on one RB pair (one-subframe length in time×12-subcarrier length in frequency). One subframe includes 14 OFDM symbols (in case of a normal CP) or 12 OFDM symbols (in case of an extended CP). The number of subcarriers used selectively in one OFDM symbol is one of 128, 256, 512, 1024, and 2048.

Figure 5:
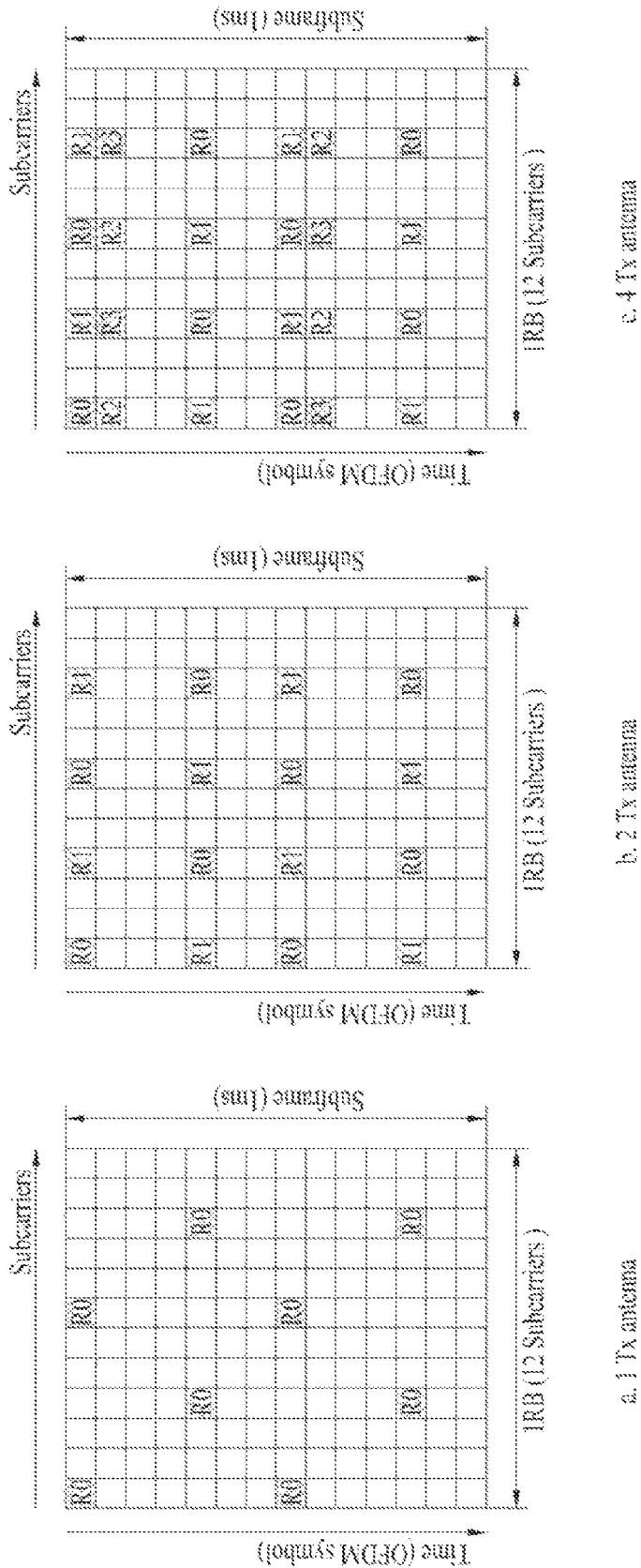
FIG. 5 is a diagram illustrating Common Reference Signal (CRS) patterns.

FIG. 5 illustrates CRS patterns when 1-TTI (i.e. one subframe) has 14 OFDM symbols. FIGS. 5(a), 5(b), and 5(c) illustrate CRS patterns in systems having 1Tx, 2Tx, and 4Tx antennas, respectively.

In FIG. 5, R0 indicates an RS for antenna port index 0. Moreover, in FIG. 5, R1, R2, and R3 denote RSs for antenna port indexes 1, 2, and 3, respectively. No signals are transmitted at RE locations at which RSs for the respective antenna ports are transmitted in order to prevent interference with other transmit antenna ports except for the transmit antenna ports for transmitting the RSs.

Figure 6:
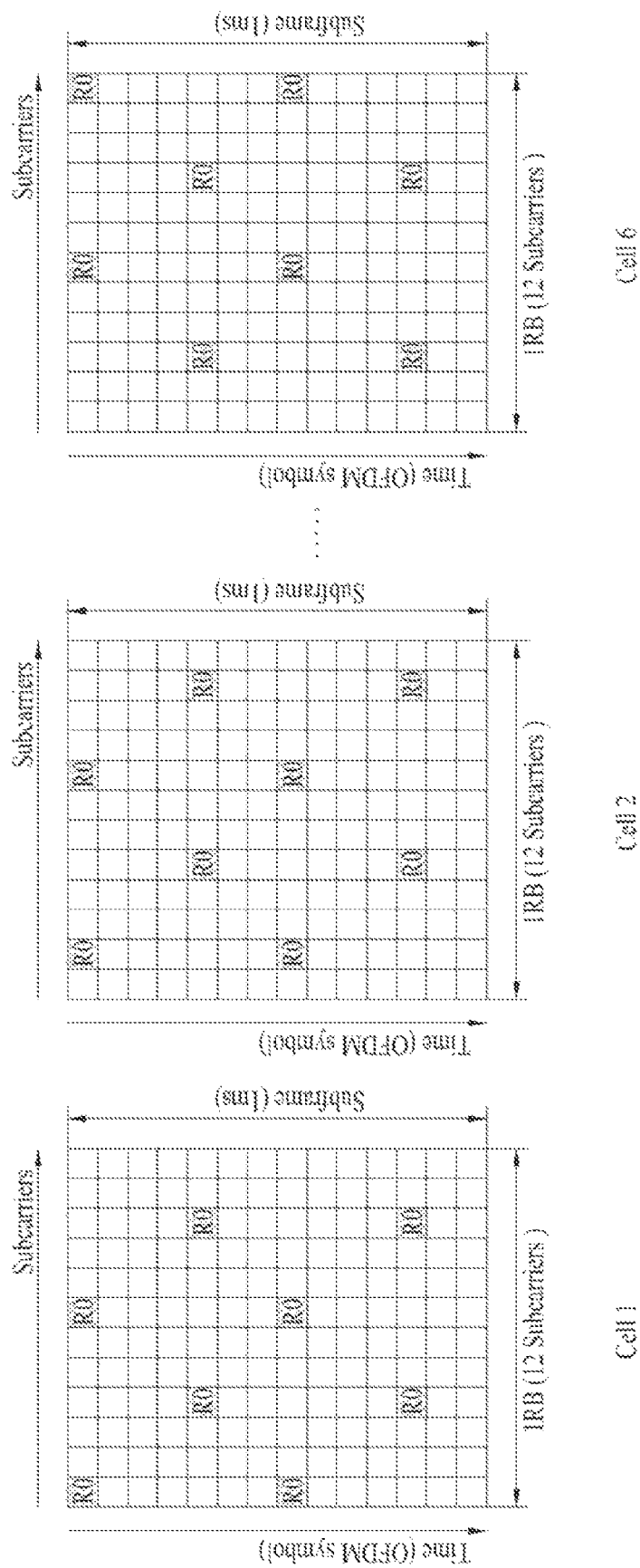
FIG. 6 is a diagram explaining a shift of an RS pattern.

FIG. 6 illustrates a shift of an RS pattern in each cell so that RSs in multiple cells do not collide. Assuming that an RS pattern for one antenna port of FIG. 5(a) is used in Cell 1 of FIG. 6, the RS pattern may be shifted in units of subcarriers or OFDM symbols in the frequency or time domain so that RSs do not collide between cells in Cell 2, Cell 3, etc. adjacent to Cell 1. For example, in case of 1-Tx antenna transmission, since an RS is located at an interval of 6 subcarriers on one OFDM symbol, a shift may be applied in units of subcarriers in the frequency domain in each cell. Then, RSs may be located on different REs in at least five neighboring cells. For example, RSs may be shifted in the frequency domain as in Cell 2 to Cell 6 of FIG. 6.

A Pseudo-random Noise (PN) sequence may be multiplied by a downlink RS in each cell and then transmitted to improve channel estimation performance by reducing interference caused by an RS received from a neighboring cell in a receiver. Such a PN sequence may be applied in units of OFDM symbols in one subframe. A different PN sequence may be applied to each cell ID, each subframe number, and each OFDM symbol location.

In a system having an extended antenna configuration (e.g. a wireless communication system supporting 8Tx antennas (e.g. a system conforming to 3GPP LTE release-10 or subsequent release)) relative to a legacy communication system (e.g. a 3GPP LTE Release-8 or release-9 system) supporting 4Tx antennas, DMRS-based data demodulation has been considered in order to support efficient RS management and an advanced transmission scheme. That is, in order to support data transmission through extended antennas, DMRSs for two or more layers may be defined. Since the DMRSs are precoded using the same precoder as a precoder used for data, it is possible for a receiver to easily estimate channel information for demodulating data without separate precoding information. Meanwhile, a downlink receiver may acquire precoded channel information with respect to the extended antenna configuration through DMRSs. However, in order to acquire non-precoded channel information, separate RSs are required in addition to the DMRSs. In a system based on the LTE-A standard, RSs for acquiring Channel State Information (CSI) in the receiver, i.e. CSI-RSs, may be defined. The CSI-RSs may be transmitted through 8 antenna ports. To distinguish antenna ports through which CSI-RSs are transmitted from antenna ports in the legacy 3GPP LTE release-8/9 system, antenna port indexes 15 to 22 may be used.

Configuration of Downlink Control Channels

The front three OFDM symbols in each subframe may be basically used as transmission regions of downlink control channels and one to three OFDM symbols may be used according to overhead of the downlink control channels. A PCFICH may be used to adjust the number of OFDM symbols for the downlink control channels in each subframe. A PHICH may be used to provide an acknowledgement (acknowledgement (ACK)/negative acknowledgement (NACK)) for uplink transmission through downlink. A PDCCH may be used to transmit control information for downlink data transmission or uplink data transmission.

Figure 7:
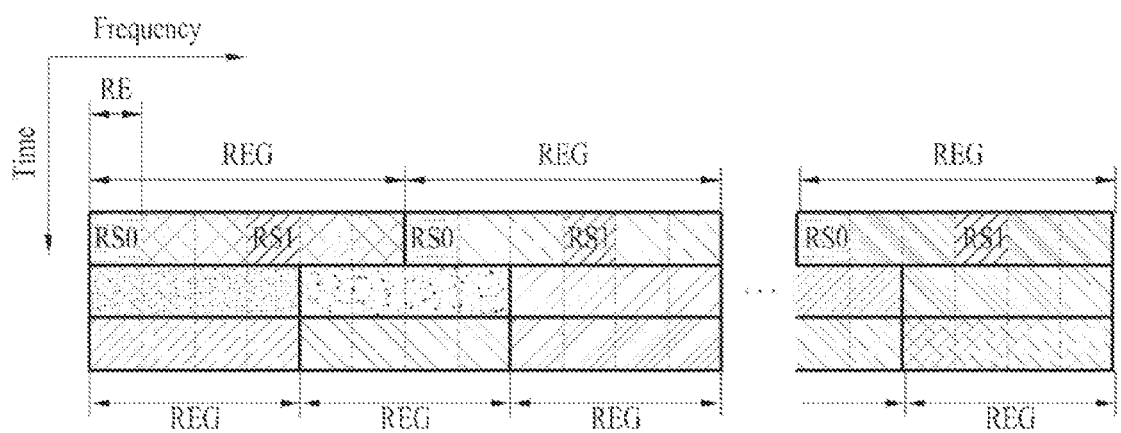
FIGS. 7 and 8 are diagrams explaining a Resource Element Group (REG) which is an allocation unit of downlink control channels.
Figure 8:
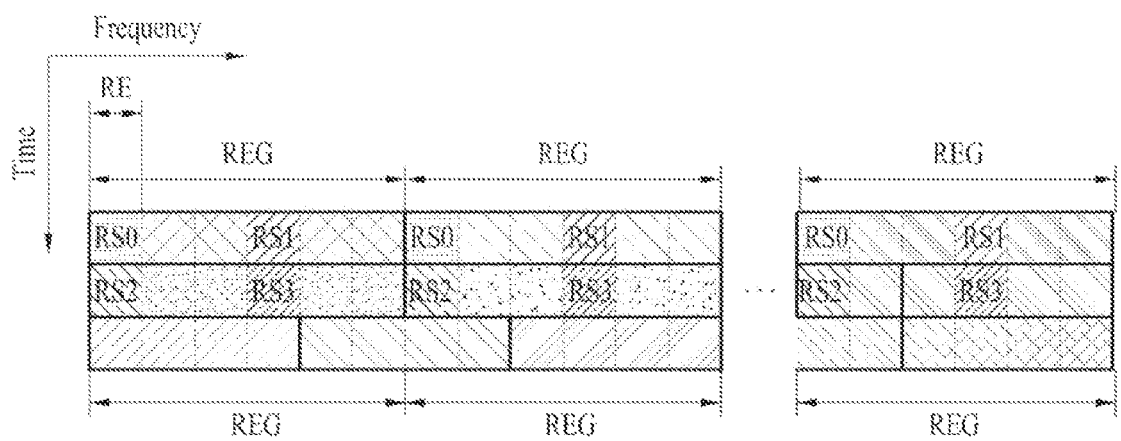

FIGS. 7 and 8 illustrate allocation of downlink control channels in units of Resource Element Groups (REGs) in a control region of each subframe. FIG. 7 illustrates allocation of downlink control channels in a system having a 1Tx or 2Tx antenna configuration and FIG. 8 illustrates allocation of downlink control channels in a system having a 4Tx antenna configuration. As illustrated in FIGS. 7 and 8, an REG, which is a basic resource allocation unit of a control channel, is composed of four contiguous REs in the frequency region except for REs to which RSs are allocated. According to overhead of the downlink control channels, a specific number of REGs may be used for transmission of the downlink control channels.

Physical Control Format Indicator Channel (PCFICH)

A PDCCH may be transmitted between OFDM symbol indexes 0 to 2 in each subframe in order to provide resource allocation information etc. of a corresponding subframe. According to control channel overhead, OFDM symbol index 0, OFDM symbol indexes 0 and 1, or OFDM symbol indexes 0 to 2 may be used. The number of OFDM symbols used for the control channels may be changed in each subframe and information about the number of OFDM symbols may be provided through a PCFICH. Accordingly, the PCFICH should be transmitted in all subframes.

Three information items may be provided through the PCFICH. The following Table 1 indicates a Control Format Indicator (CFI) of the PCFICH. CFI=1 indicates that a PDCCH is transmitted in OFDM symbol index 0, CFI=2 indicates that the PDCCH is transmitted in OFDM symbol indexes 0 and 1, and CFI=3 indicates that the PDCCH is transmitted in OFDM symbol indexes 0 to 2.

TABLE 1

| CFI | CFI codeword $<b_0, b_1, \ldots, b_{31}>$ |
| --- | --- |
| 1 | <0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1> |
| 2 | <1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1, 0> |
| 3 | <1, 1, 0, 1, 1, 0, 1, 1, 0, 1, 1, 0, 1, 1, 0, 1, 1, 0, 1, 1, 0, 1, 1, 0, 1, 1, 0, 1, 1, 0, 1, 1> |
| 4 (Reserved) | <0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0, 0> |

The information transmitted through the PCFICH may be differently defined according to system bandwidth. For example, if the system bandwidth is less than a specific threshold, CFI=1, 2, and 3 may indicate that two, three, and four OFDM symbols are used for the PDCCH, respectively.

Figure 9:
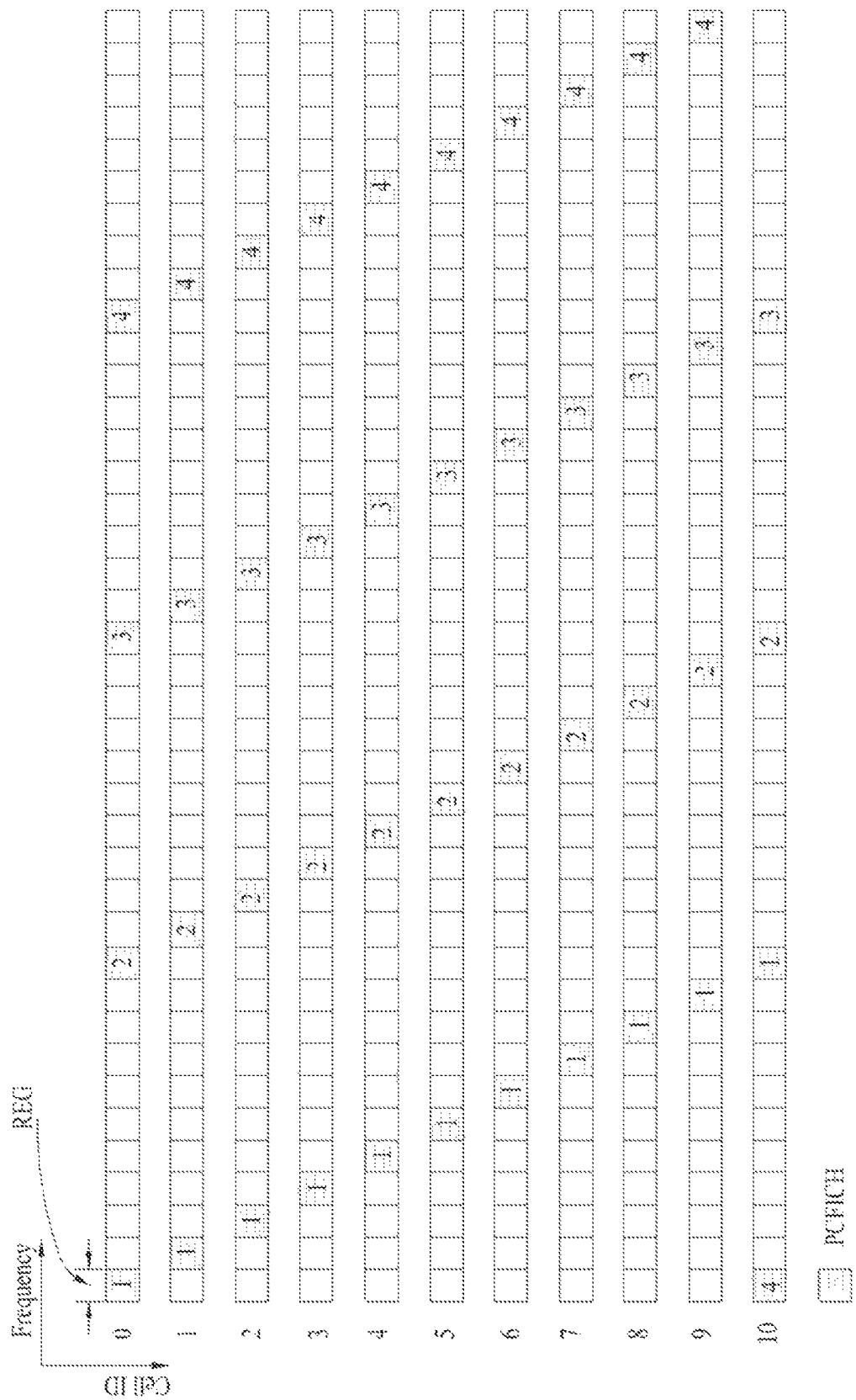
FIG. 9 is a diagram illustrating a PCFICH transmission scheme.

FIG. 9 is a diagram illustrating a PCFICH transmission scheme. An REG shown in FIG. 9 may be composed of four subcarriers and includes only data subcarriers except for an RS. Generally, a transmit diversity scheme may be applied to the REG. The location of the REG may be shifted in the frequency domain in each cell (i.e. according to a cell ID) so as not to create intercell interference. Additionally, the PCFICH is always transmitted on the first OFDM symbol (OFDM symbol index 0) of a subframe. Then, upon receiving the subframe, a receiver checks the PCFICH information to discern the number of OFDM symbols on which the PDCCH is transmitted and receive control information transmitted through the PDCCH.

Physical Hybrid-ARQ Indicator Channel (PHICH)

Figure 10:
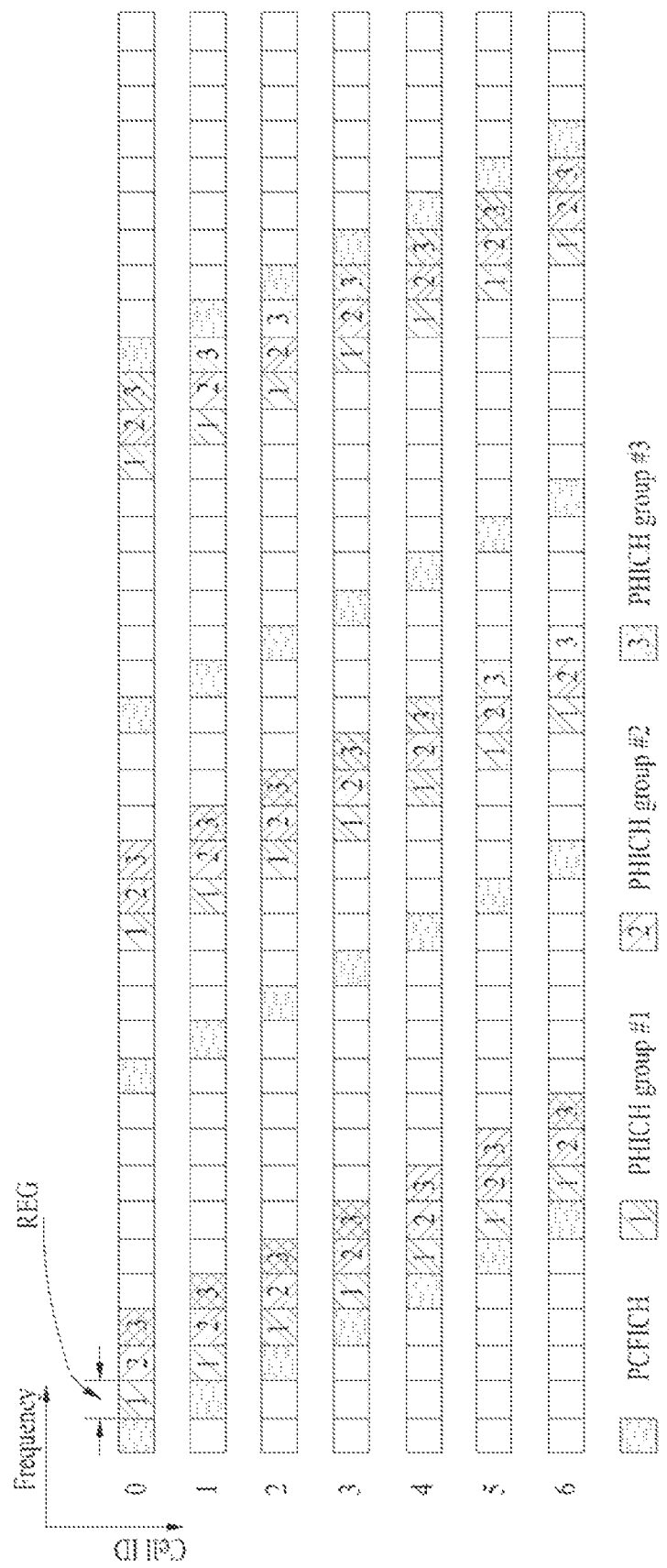
FIG. 10 is a diagram illustrating locations of a PCFICH and a PHICH.

FIG. 10 is a diagram illustrating locations of a PCFICH and a PHICH which are generally applied in a specific bandwidth. ACK/NACK information for uplink data transmission is transmitted through the PHICH. A plurality of PHICH groups is formed in one subframe and one PHICH group includes a plurality of PHICHs. Accordingly, one PHICH group includes PHICHs for multiple UEs.

As illustrated in FIG. 10, PHICH allocation for each UE in a plurality of PHICH groups is performed using the lowest Physical Resource Block (PRB) index of PUSCH resource allocation and using a cyclic shift index for a DMRS transmitted through an uplink grant PDCCH. The DMRS is an uplink RS and is provided together with uplink transmission for channel estimation for demodulation of uplink data. A PHICH resource is known through an index pair such as ($n_{PHICH}^{group}$, $n_{PHICH}^{seq}$). In ($n_{PHICH}^{group}$, $n_{PHICH}^{seq}$), $n_{PHICH}^{group}$ denotes a PHICH group number and $n_{PHICH}^{seq}$ denotes an orthogonal sequence index in a corresponding PHICH group. $n_{PHICH}^{group}$ and $n_{PHICH}^{seq}$ are defined as the following Equation 1.

$$n_{PHICH}^{group} = (I_{PRB\_RA}^{lowest\_index} + n_{DMRS}) \bmod N_{PHICH}^{group}$$

$$n_{PHICH}^{seq} = (\lfloor I_{PRB\_RA}^{lowest\_index}/N_{PHICH}^{group} \rfloor + n_{DMRS}) \bmod 2N_{SF}^{PHICH}$$ [Equation 1]

In Equation 1, $n_{DMRS}$ indicates a cyclic shift of a DMRS used in PHICH-associated uplink transmission, $N_{SF}^{PHICH}$ is a spreading factor size used for a PHICH, $I_{PRB\_RA}^{lowest\_index}$ is the lowest PRB index of uplink resource allocation, and $n_{PHICH}^{group}$ is the number of configured PHICH groups and is defined as follows.

$$N_{PHICH}^{group} = \begin{cases} \lceil N_g(N_{RB}^{DL}/8) \rceil & \text{for normal cyclic prefix} \\ 2 \cdot \lceil N_g(N_{RB}^{DL}/8) \rceil & \text{for extended cyclic prefix} \end{cases}$$ [Equation 2]

In Equation 2, $N_g$ denotes information about the amount of PHICH resources transmitted over a Physical Broadcast Channel (PBCH). $N_g$ has a size of 2 bits and is expressed as $N_g \in \{1/6, 1/2, 1, 2\}$.

An example of an orthogonal sequence defined in the legacy 3GPP LTE release-8/9 system is shown in Table 2.

TABLE 2

| Sequence index $n_{PHICH}^{seq}$ | Orthogonal sequence | |
|---|---|---|
| | Normal cyclic prefix $N_{SF}^{PHICH} = 4$ | Extended cyclic prefix $N_{SF}^{PHICH} = 2$ |
| 0 | [+1 +1 +1 +1] | [+1 +1] |
| 1 | [+1 −1 +1 −1] | [+1 −1] |
| 2 | [+1 +1 −1 −1] | [+j +j] |
| 3 | [+1 −1 −1 +1] | [+j −j] |
| 4 | [+j +j +j +j] | — |
| 5 | [+j −j +j −j] | — |
| 6 | [+j +j −j −j] | — |
| 7 | [+j −j −j +j] | — |

Figure 11:
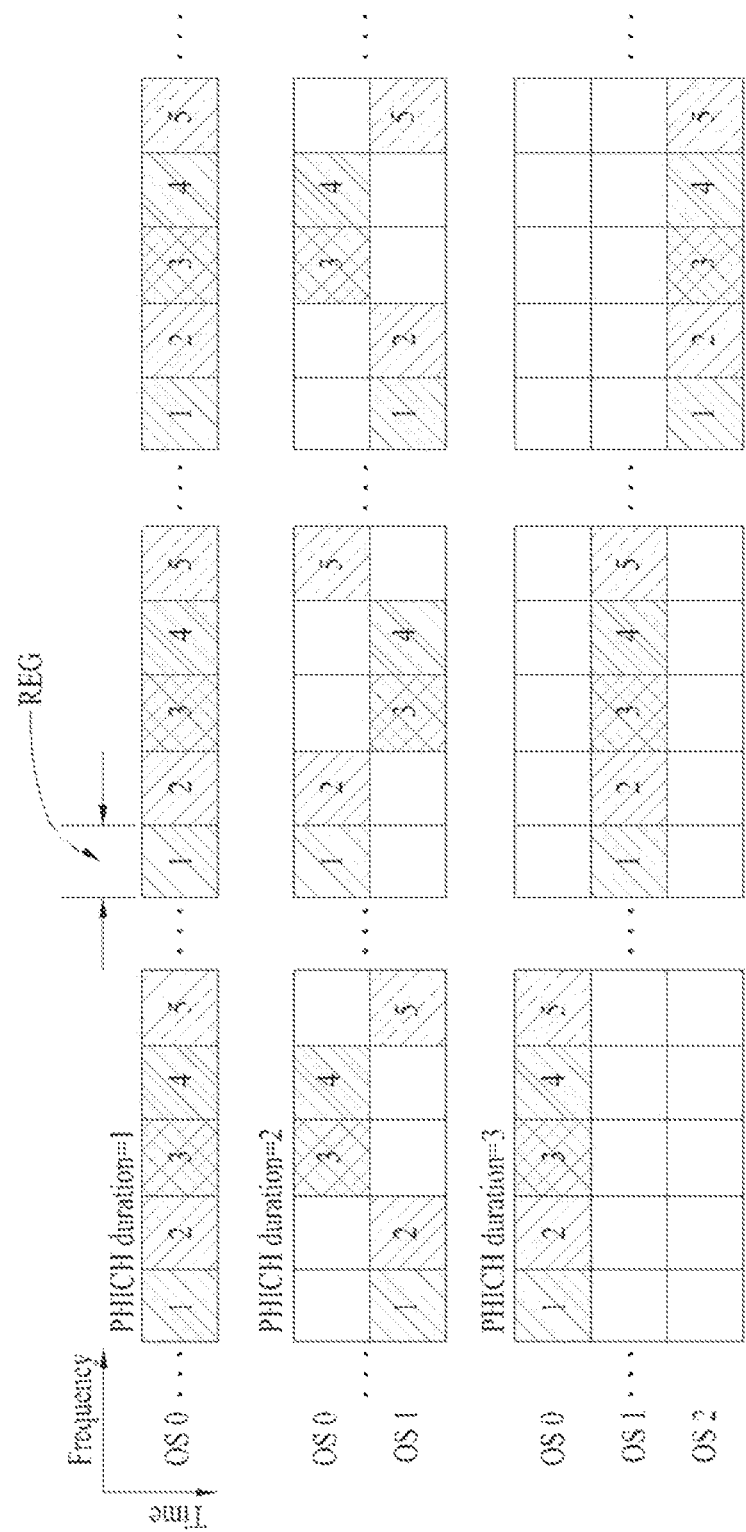
FIG. 11 is a diagram illustrating a downlink RE location to which a PHICH group is mapped.

FIG. 11 is a diagram illustrating a downlink RE location to which a PHICH group is mapped. PHICH groups may be configured in different time regions (i.e. different OFDM Symbols (OSs)) in one subframe as illustrated in FIG. 11 according to a PHICH duration.

Physical Downlink Control Channel (PDCCH)

Control information transmitted through a PDCCH has different sizes and usages according to a DCI format and the size of the PDCCH may differ according to coding rate. For example, DCI formats used in legacy 3GPP LTE release-8/9 may be defined as shown in Table 3.

TABLE 3

| DCI format | Objectives |
|---|---|
| 0 | Scheduling of PUSCH |
| 1 | Scheduling of one PDSCH codeword |
| 1A | Compact scheduling of one PDSCH codeword |
| 1B | Closed-loop single-rank transmission |
| 1C | Paging, RACH response and dynamic BCCH |
| 1D | MU-MIMO |
| 2 | Scheduling of rank-adapted closed-loop spatial multiplexing mode |
| 2A | Scheduling of rank-adapted open-loop spatial multiplexing mode |
| 3 | TPC commands for PUCCH and PUSCH with 2-bit power adjustments |
| 3A | TPC commands for PUCCH and PUSCH with single bit power adjustments |

The DCI formats of the above Table 3 are independently applied with respect to each UE and PDCCHs of multiple UEs may be simultaneously multiplexed in one subframe. The multiplexed PDCCHs of the respective UEs are independently channel-coded and a CRC is applied thereto. A unique ID of each UE is masked to a CRC of a PDCCH so that the UE may receive a PDCCH thereof. However, since the UE is basically unable to know a PDCCH location thereof, the UE should perform blind detection by checking whether each of PDCCHs of a corresponding DCI format in every subframe corresponds to a PDCCH having an ID thereof until the corresponding PDCCH is received. A basic resource allocation unit of the PDCCH is a Control Channel Element (CCE) and one CCE includes 9 REGs. One PDCCH may be composed of one, two, four, or eight CCEs. A PDCCH configured according to each UE is interleaved and mapped to a control channel region of each subframe by a CCE-to-RE mapping rule. An RE location to which a CCE is mapped may differ according to the number of OFDM symbols for control channels of each subframe, the number of PHICH groups, transmit antennas, and frequency shifts.

Uplink Retransmission

Uplink retransmission may be indicated through the above-described PHICH and DCI format 0 (a DCI format for scheduling PUSCH transmission). A UE may receive ACK/

NACK for previous uplink transmission through the PHICH to perform synchronous non-adaptive retransmission or receive an uplink grant through a PDCCH of DCI format 0 from a BS to perform synchronous adaptive retransmission.

Synchronous transmission refers to a scheme by which retransmission is performed at a predetermined time point (e.g. an (n+k)-th subframe where k may be 4 for example) after a time point (e.g. an n-th subframe) at which one data packet is transmitted. Synchronous retransmission is applied to both retransmission by the PHICH and retransmission by the uplink grant PDCCH.

In case of non-adaptive retransmission performing retransmission through the PHICH, the same frequency resource and transmission method as a frequency resource (e.g. a PRB) and transmission method (e.g. a modulation scheme) used for previous transmission are used for retransmission. Meanwhile, in case of adaptive retransmission performing retransmission through the uplink grant PDCCH, a frequency resource and transmission method different from those used for previous transmission may be used according to scheduling control information indicated by the uplink grant.

Upon simultaneously receiving the PHICH and the uplink grant PDCCH, the UE may disregard the PHICH to perform uplink transmission according to the control information of the uplink grant PDCCH. The uplink grant PDCCH (e.g. DCI format 0) includes a New Data Indicator (NDI). If an NDI bit is toggled compared to a previous NDI value, the UE judges that previous transmission is successful and may transmit new data. Meanwhile, even when the UE receives ACK for previous transmission through the PHICH, if an NDI value is not toggled on the uplink grant PDCCH received at the same time as PHICH reception or received after PHICH reception, the UE is configured so as not to flush a buffer for previous transmission.

Uplink Transmission Configuration

Figure 12:
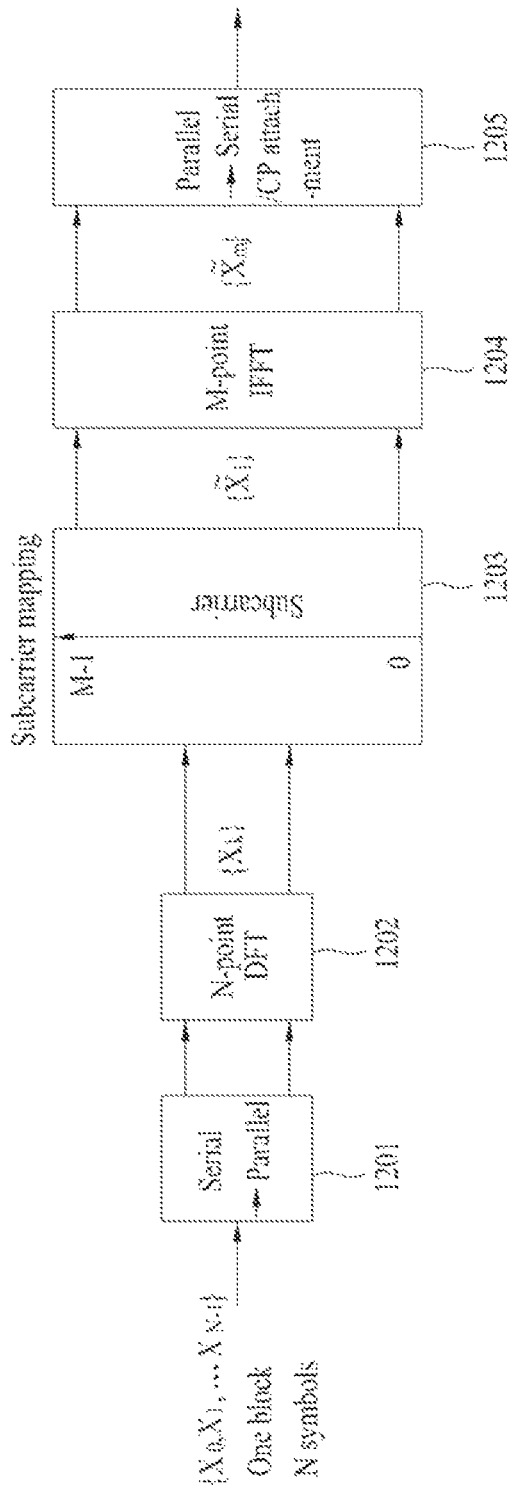
FIG. 12 is a diagram illustrating the structure of a transmitter according to an SC-FDMA scheme.

FIG. 12 is a diagram illustrating the structure of a transmitter according to an SC-FDMA scheme.

One block including N symbols supplied to the transmitter is converted into parallel signals through a serial-to-parallel converter 1201. The parallel signals are spread through an N-point DFT module 1202 and the spread signals are mapped to signals in the frequency domain by a subcarrier mapping module 1203. Signals on subcarriers are linear combinations of the N symbols. The signals mapped in the frequency domain are converted into time-domain signals through an M-point IFFT module 1204. The time-domain signals are converted into serial signals through a parallel-to-serial converter 1205 and a CP is attached to the serial signals. The influence of IFFT processing of the M-point IFFT module 1204 is partially offset by DFT processing of the N-point DFT module 1202. In this sense, the SC-FDMA scheme may be referred to as a DFT-spread-OFDMA (DFT-s-OFDMA) scheme. Although the signals supplied to the DFT module 1202 have a low Peak-to-Average Power Ratio (PAPR) or Cubic Metric (CM) property, the signals may have a high PAPR after DFT processing and the signals generated by IFFT processing of the IFFT module 1204 may have a low PAPR again. That is, the SC-FDMA scheme can reduce costs for implementing the transmitter by avoiding a non-linear distortion interval of a Power Amplifier (PA) during transmission.

FIG. 13 is a diagram explaining schemes of mapping the signals generated from the DFT module 1202 to the signals in the frequency domain. The signal generated from the SC-FDMA transmitter may satisfy a single carrier property by performing one of two schemes shown in FIG. 13. FIG. 13(a) illustrates a localized mapping scheme by which the signals generated from the DFT module 1202 are locally mapped to a specific part of a subcarrier region. FIG. 13(b) illustrates a distributed mapping scheme by which the signals generated from the DFT modules 1202 are distributively mapped to a whole subcarrier region. In the legacy 3GPP LTE release-8/9 system, use of the localized mapping scheme is defined.

Figure 14:
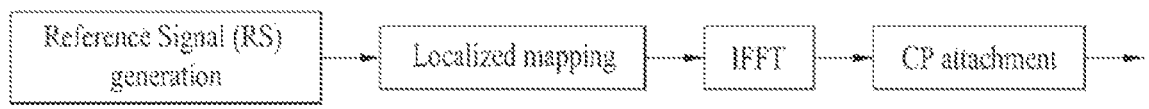
FIG. 14 is a block diagram explaining transmission processing of an RS.

FIG. 14 is a block diagram explaining transmission processing of an RS for demodulating a transmission signal according to an SC-FDMA scheme. In the legacy 3GPP LTE release-8/9 system, while a data part is transmitted such that signals generated in the time domain are converted into frequency-domain signals through DFT processing, are mapped to signals on subcarriers, and then are IFFT processed (refer to FIG. 12), RSs are directly generated in the frequency domain by omitting DFT processing, mapped to signals on subcarriers, IFFT processed, and CP attached.

FIG. 15 is a diagram illustrating a symbol location to which an RS is mapped in a subframe structure according to an SC-FDMA scheme. In a normal CP case of FIG. 15(a), RSs are located in the fourth SC-FDMA symbol of each of two slots in one subframe. In an extended CP case of FIG. 15(b), RSs are located in the third SC-FDMA symbol of each of two slots in one subframe.

A clustered DFT-s-OFDMA scheme will now be described with reference to FIGS. 16 to 19. The clustered DFT-s-OFDMA scheme is a modification of the above-described SC-FDMA scheme and refers to a scheme by which DFT processed signals are divided into a plurality of sub-blocks and the sub-blocks are mapped to separate locations in the frequency domain.

Figure 16:
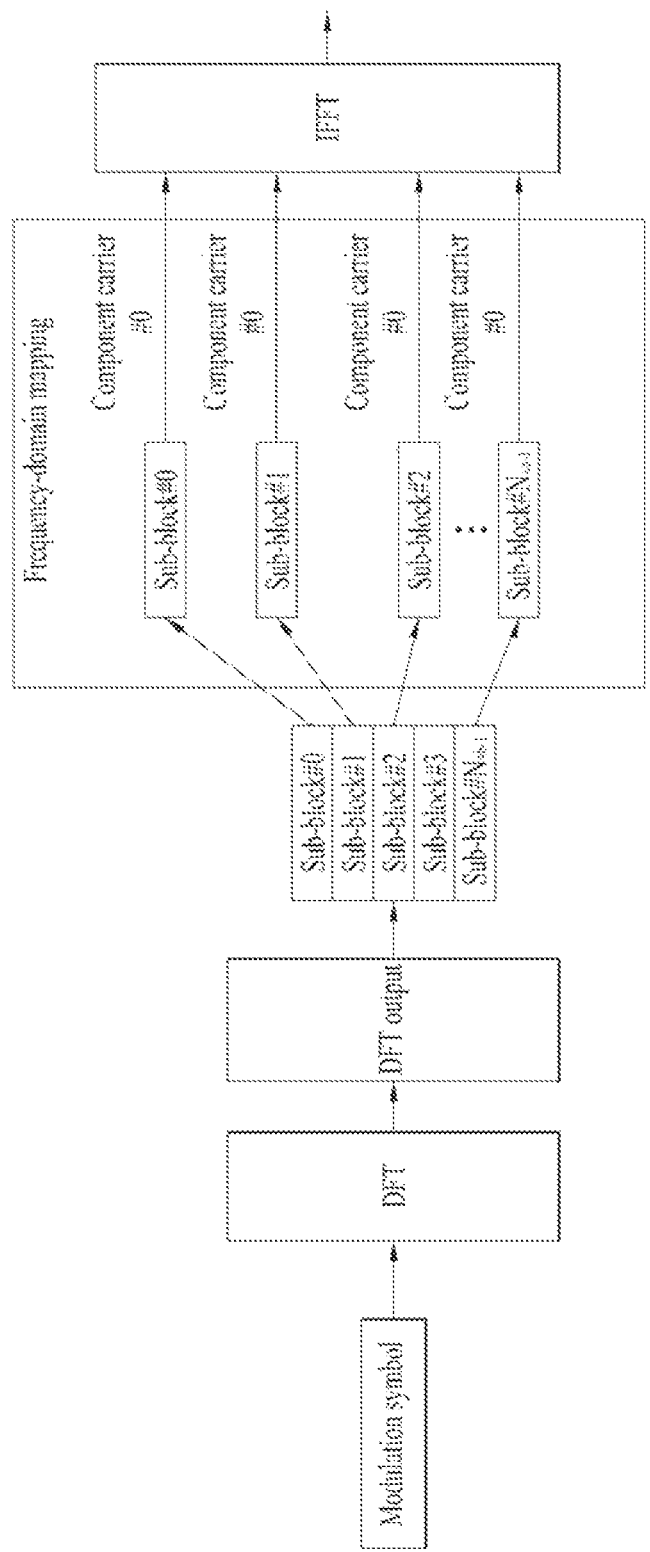
FIGS. 16 to 19 are diagrams illustrating a clustered DFT-s-OFDMA scheme.

FIG. 16 is a diagram explaining a clustered DFT-s-OFDMA scheme on a single carrier. For example, a DFT output may be divided into Nsb sub-blocks (sub-block#0 to sub-block#Nsb-1). In mapping the sub-blocks to signals in the frequency domain, sub-block#0 to sub-block#Nsb-1 are all mapped to one carrier (e.g. a carrier having a bandwidth of 20 MHz) and the respective sub-blocks may be mapped to separate locations in the frequency domain. Alternatively, the respective sub-blocks may be locally mapped in the frequency domain.

Figure 17:
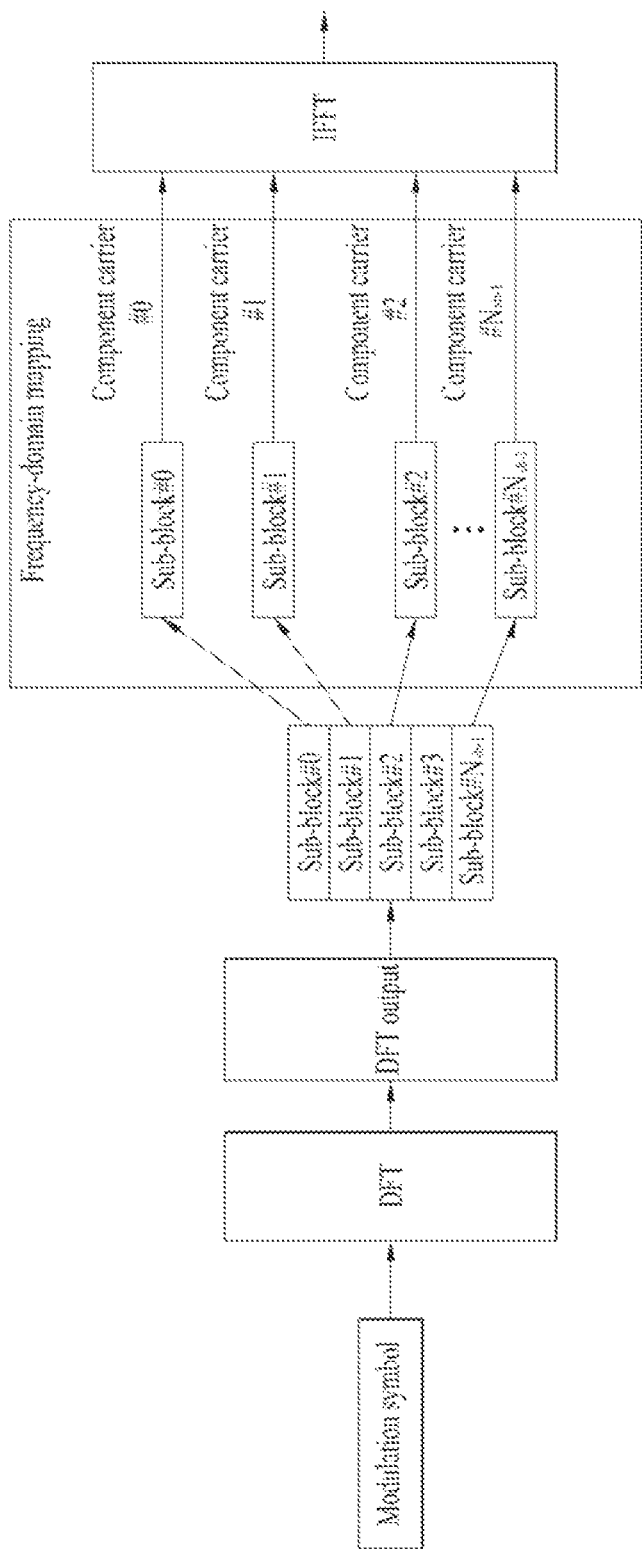
Figure 18:
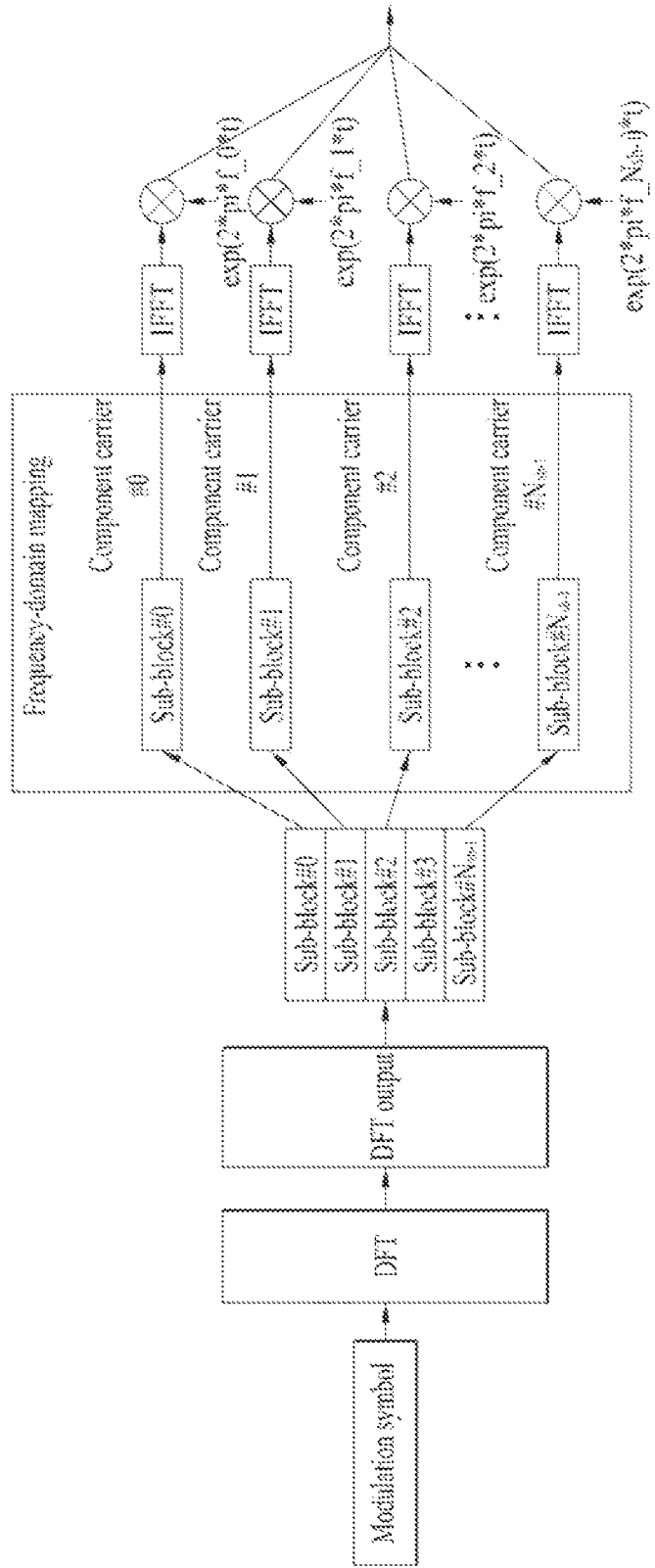

FIGS. 17 and 18 are diagrams explaining a clustered DFT-s-OFDMA scheme on multiple carriers.

FIG. 17 illustrates an example capable of generating a signal through one IFFT module when subcarrier spacing between contiguous carriers is aligned in a situation in which multiple carriers (or multiple cells) are contiguously configured (i.e. in a situation in which frequency bands of each of multiple carriers (or multiple cells) are contiguously allocated). For example, a DFT output may be divided into Nsb sub-blocks (sub-block#0 to sub-block#Nsb-1). In mapping the sub-blocks to signals in the frequency domain, sub-block#0 to sub-block#Nsb-1 are respectively mapped to component carrier#0 to component carrier#Nsb-1 (each carrier (or cell) may have a bandwidth of 20 MHz for example). Also, the respective sub-blocks may be locally mapped in the frequency domain. The sub-blocks mapped to the respective carriers (or cells) may be converted into time-domain signals through one IFFT module.

FIG. 18 illustrates an example of generating a signal through a plurality of IFFT modules in a situation in which multiple carriers (or cells) are non-contiguously configured (i.e. in a situation in which frequency bands of each of multiple carriers (or multiple cells) are non-contiguously allocated). For example, a DFT output may be divided into Nsb sub-blocks (sub-block#0 to sub-block#Nsb-1). In mapping the sub-blocks to signals in the frequency domain, sub-block#0 to sub-block#Nsb-1 may be respectively mapped to carrier#0 to carrier#Nsb-1 (each carrier (or cell) may have a bandwidth of 20 MHz). Also, the respectively sub-blocks may be locally mapped in the frequency domain. The sub-blocks mapped to the respective carriers (cells) may be converted into time-domain signals through the respective IFFT modules.

If the clustered DFT-s-OFDMA scheme on a single carrier described with reference to FIG. 16 is intra-carrier (or intra-cell) DFT-s-OFDMA, the clustered DFT-s-OFDMA scheme on multiple carriers (or cells) described with reference to FIGS. 17 and 18 may be called inter-carrier (or inter-cell) DFT-s-OFDMA. A hybrid scheme of Intra-carrier DFT-s-OFDMA and inter-carrier DFT-s-OFDMA may be used.

Figure 19:
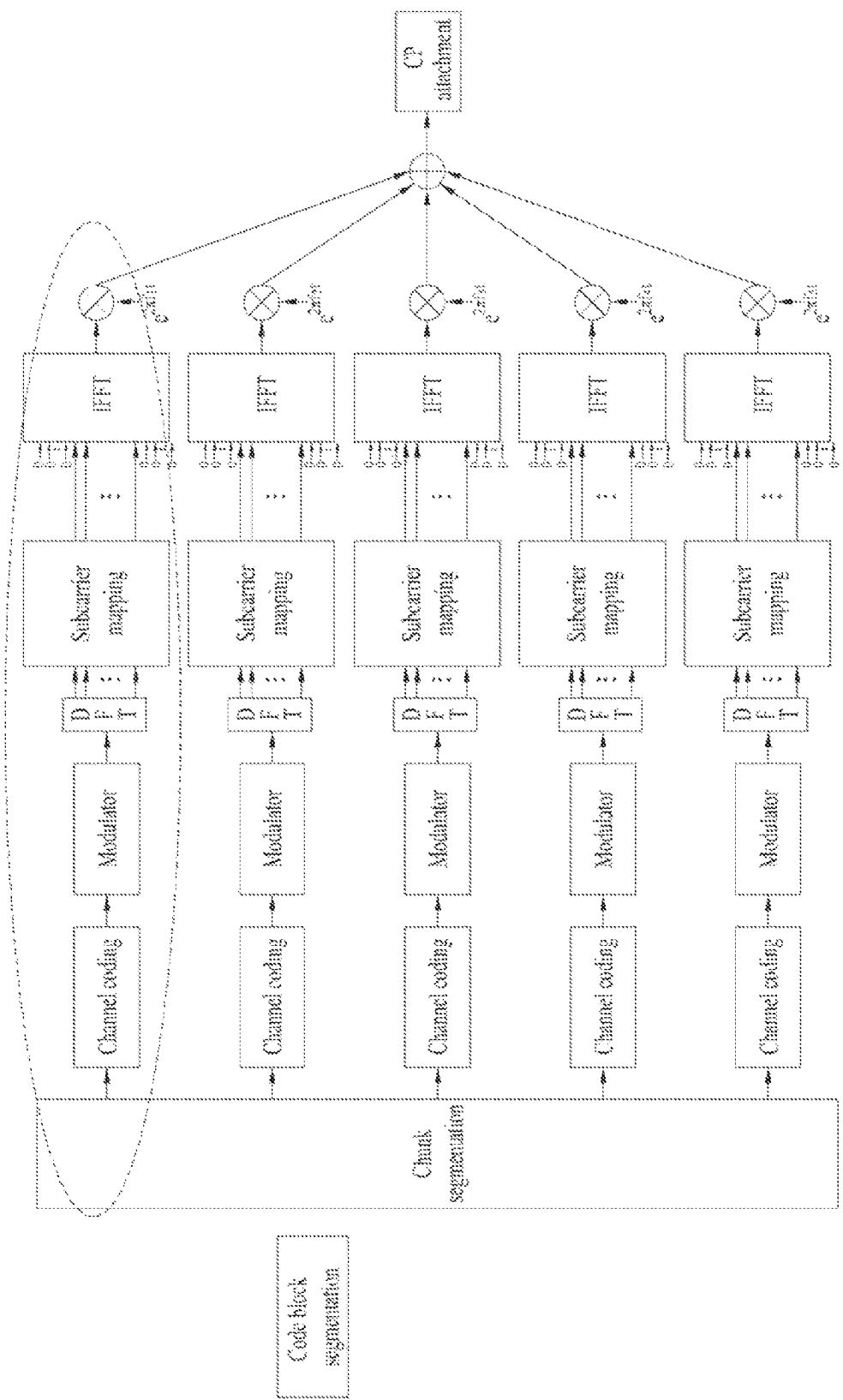

FIG. 19 is a diagram explaining a chunk-specific DFT-s-OFDMA scheme for performing DFT processing, frequency-domain mapping, and IFFT processing on a chunk basis. Chunk-specific DFT-s-OFDMA may also be called Nx SC-FDMA. A code block segmentation signal is chunk segmented, channel coded and modulated. The modulated signal is DFT processed, mapped in the frequency domain, and IFFT processed in the same manner as in the description of FIG. 12. Outputs from IFFT modules are summed and a CP may be attached thereto. The Nx SC-FDMA scheme described in FIG. 19 may be applied to both concatenated multiple carriers (or multiple cells) and non-concatenated multiple carriers (multiple cells).

Structure of MIMO System

Figure 20:
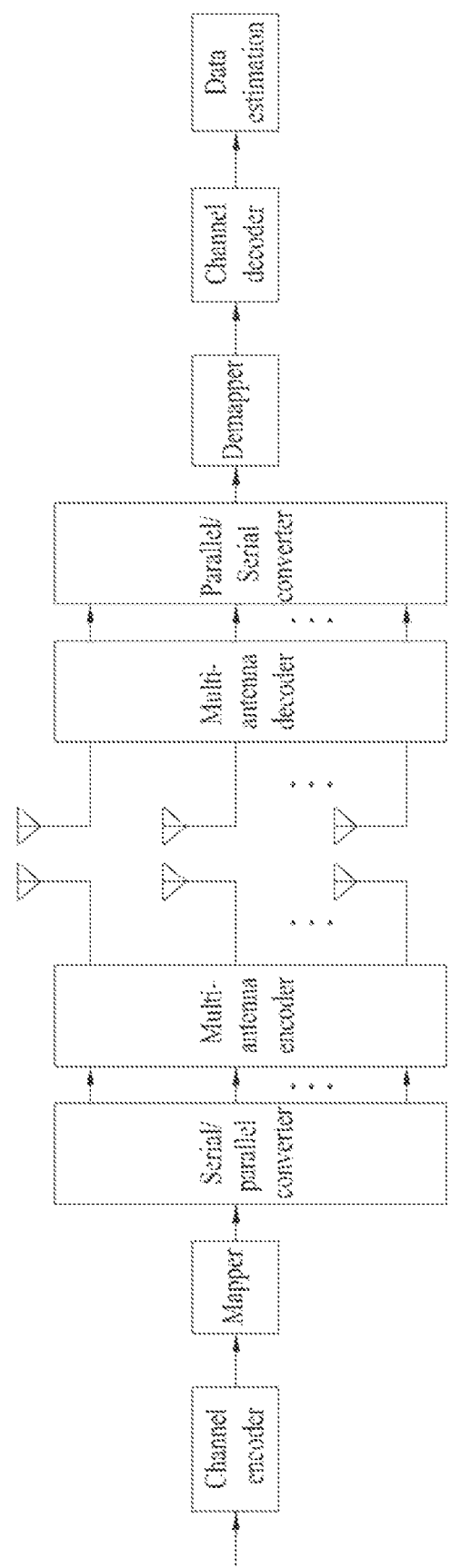
FIG. 20 is a diagram illustrating the structure of a MIMO system.

FIG. 20 is a diagram illustrating a basic structure of a MIMO system having multiple transmit antennas and/or multiple receive antennas. Each block shown in FIG. 20 conceptually illustrates a function or operation in a transmitter and a receiver for MIMO transmission.

In FIG. 20, a channel encoder adds a redundancy bit to an input data bit, thereby reducing an influence caused by noise etc. from a channel. A mapper converts data bit information into data symbol information. A serial/parallel converter converts serial data into parallel data. A multiantenna encoder converts data symbols into time-spatial signals. Multiple antennas of the transmitter function to transmit the time-spatial signals through channels. Multiple antennas of the receiver serve to receive the signals through channels.

A multiantenna decoder of FIG. 20 converts the received time-spatial signals into data symbols. A parallel/serial converter converts parallel signals into a serial signal. A demapper converts a data symbol into data bit information. A channel decoder decodes channel codes and, as a result, data can be estimated.

The aforementioned MIMO transmission/reception system may spatially include one or multiple codewords according to spatial multiplexing rate. A case having one codeword is referred to as a Single Codeword (SCW) structure and a case having multiple codewords is referred to as a Multiple Codeword (MCW) structure.

Figure 21:
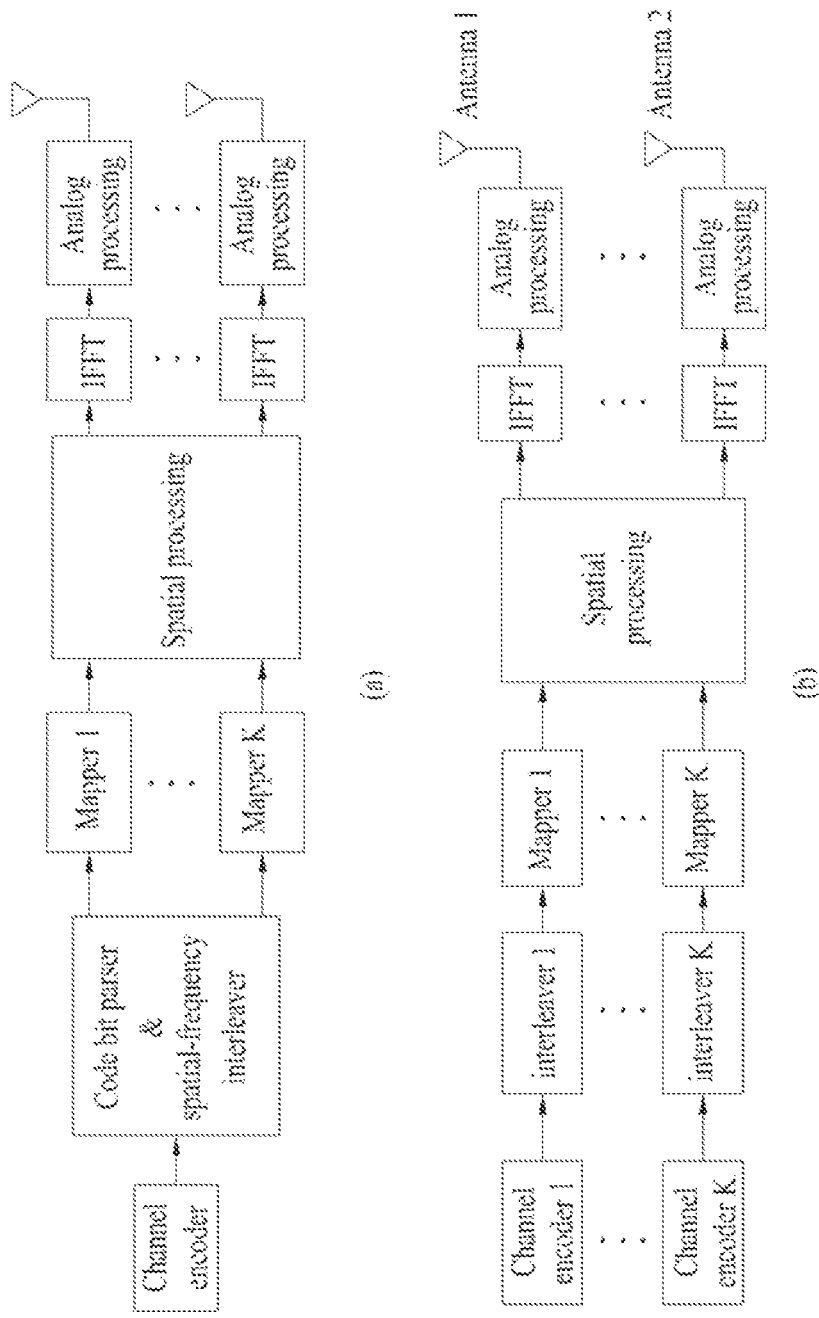
FIG. 21 is a block diagram illustrating the function of a MIMO system.

FIG. 21($a$) is a block diagram illustrating the function of a transmitter of a MIMO system having an SCW structure and FIG. 21($b$) is a block diagram illustrating the function of a transmitter of a MIMO system having an MCW structure.

Codebook-Based Precoding Scheme

To support multiantenna transmission, precoding for properly distributing transmission information to antennas according to a channel state may be applied. A codebook-based precoding scheme refers to a scheme by which a transmitter and a receiver predetermine a set of precoding matrices, the receiver feeds back the most suitable precoding matrix (i.e. a Precoding Matrix Index (PMI)) to the transmitter by measuring channel information received from the transmitter, and the transmitter applies proper precoding based on the PMI to signal transmission. Since the codebook-based precoding scheme selects a proper precoding matrix from the predetermined precoding matrix set, feedback overhead can be reduced compared with explicit feedback of optimal precoding information to actual channel information even though optimal precoding cannot be always applied.

Figure 22:
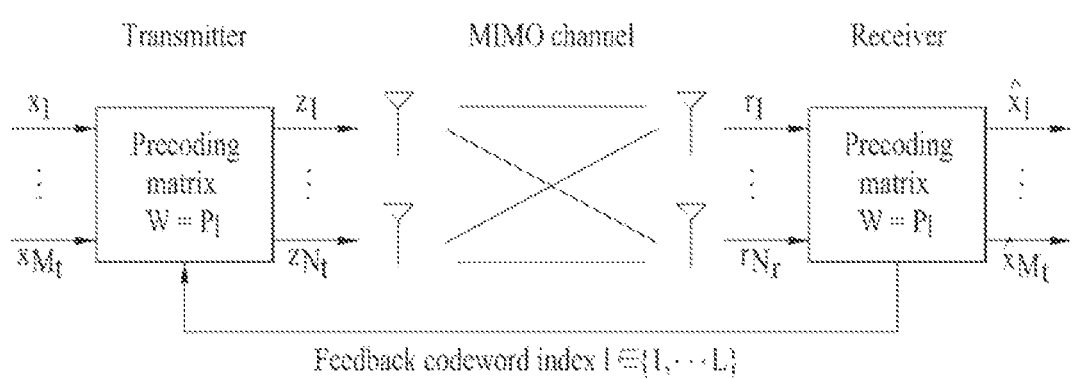
FIG. 22 is a diagram explaining a basic concept of codebook-based precoding.

FIG. 22 is a diagram explaining a basic concept of codebook-based precoding.

In the codebook-based precoding scheme, a transmitter and a receiver share codebook information including a predetermined number of precoding matrices according to transmission rank, the number of antennas, etc. That is, the precoding-based codebook scheme may be used when feedback information is finite. The receiver may measure a channel state from a received signal and feed back information about a finite number of preferred precoding matrices (i.e. indexes of the precoding matrices) based on the afore-described codebook information to the transmitter. For example, the receiver may measure a received signal by Maximum Likelihood (ML) or Minimum Mean Square Error (MMSE) and select an optimal precoding matrix. In the illustrated example of FIG. 22, the receiver transmits precoding matrix information for each codeword to the transmitter, which should not be construed as limiting the present invention.

Upon receipt of feedback information from the receiver, the transmitter may select a specific precoding matrix from a codebook based on the received information. After selecting the precoding matrix, the transmitter may precode a transmission signal by multiplying as many layer signals as a transmission rank by the selected precoding matrix and transmit the precoded transmission signal through a plurality of antennas. The number of rows of the precoding matrix is equal to the number of antennas and the number of columns of the precoding matrix is equal to a rank value. Since the rank value is identical to the number of layers, the number of columns of the precoding matrix is identical to the number of layers. For example, if the number of transmit antennas is 4 and the number of transmission layers is 2, the precoding matrix may be a 4×2 matrix. Information transmitted through respective layers may be mapped to respective antennas by the precoding matrix.

Upon receipt of the precoded signal from the transmitter, the receiver may recover the received signal by reversely performing the precoding of the transmitter. Generally, a precoding matrix satisfies a unitary matrix U condition such as $U*U^H=I$. The reverse operation of precoding may be performed by multiplying a Hermitian matrix $P^H$ of a precoding matrix P used in precoding of the transmitter by a received signal.

For example, the following Table 4 indicates a codebook used for downlink transmission using 2Tx antennas in 3GPP LTE release-8/9 and Table 5 indicates a codebook used for downlink transmission using 4Tx antennas in 3GPP LTE release-8/9.

TABLE 4

| Codebook | Number of rank | |
|---|---|---|
| index | 1 | 2 |
| 0 | $\frac{1}{\sqrt{2}}\begin{bmatrix}1\\1\end{bmatrix}$ | $\frac{1}{\sqrt{2}}\begin{bmatrix}1&0\\0&1\end{bmatrix}$ |
| 1 | $\frac{1}{\sqrt{2}}\begin{bmatrix}1\\-1\end{bmatrix}$ | $\frac{1}{2}\begin{bmatrix}1&1\\1&-1\end{bmatrix}$ |

TABLE 4-continued

| Codebook index | Number of rank | |
|---|---|---|
| | 1 | 2 |
| 2 | $\frac{1}{\sqrt{2}}\begin{bmatrix} 1 \\ j \end{bmatrix}$ | $\frac{1}{2}\begin{bmatrix} 1 & 1 \\ j & -j \end{bmatrix}$ |
| 3 | $\frac{1}{\sqrt{2}}\begin{bmatrix} 1 \\ -j \end{bmatrix}$ | — |

TABLE 5

| Codebook index | $u_n$ | Number of layers $\upsilon$ | | | |
|---|---|---|---|---|---|
| | | 1 | 2 | 3 | 4 |
| 0 | $u_0 = [1\ -1\ -1\ -1]^T$ | $W_0^{\{1\}}$ | $W_0^{\{14\}}/\sqrt{2}$ | $W_0^{\{124\}}/\sqrt{3}$ | $W_0^{\{1234\}}/2$ |
| 1 | $u_1 = [1\ -j\ 1\ j]^T$ | $W_1^{\{1\}}$ | $W_1^{\{12\}}/\sqrt{2}$ | $W_1^{\{123\}}/\sqrt{3}$ | $W_1^{\{1234\}}/2$ |
| 2 | $u_2 = [1\ 1\ -1\ 1]^T$ | $W_2^{\{1\}}$ | $W_2^{\{12\}}/\sqrt{2}$ | $W_2^{\{123\}}/\sqrt{3}$ | $W_2^{\{3214\}}/2$ |
| 3 | $u_3 = [1\ j\ 1\ -j]^T$ | $W_3^{\{1\}}$ | $W_3^{\{12\}}/\sqrt{2}$ | $W_3^{\{123\}}/\sqrt{3}$ | $W_3^{\{3214\}}/2$ |
| 4 | $u_4 = [1\ (-1-j)/\sqrt{2}\ -j\ (1-j)/\sqrt{2}]^T$ | $W_4^{\{1\}}$ | $W_4^{\{14\}}/\sqrt{2}$ | $W_4^{\{124\}}/\sqrt{3}$ | $W_4^{\{1234\}}/2$ |
| 5 | $u_5 = [1\ (1-j)/\sqrt{2}\ j\ (-1-j)/\sqrt{2}]^T$ | $W_5^{\{1\}}$ | $W_5^{\{14\}}/\sqrt{2}$ | $W_5^{\{124\}}/\sqrt{3}$ | $W_5^{\{1234\}}/2$ |
| 6 | $u_6 = [1\ (1+j)/\sqrt{2}\ -j\ (-1+j)/\sqrt{2}]^T$ | $W_6^{\{1\}}$ | $W_6^{\{13\}}/\sqrt{2}$ | $W_6^{\{134\}}/\sqrt{3}$ | $W_6^{\{1324\}}/2$ |
| 7 | $u_7 = [1\ (-1+j)/\sqrt{2}\ j\ (1+j)/\sqrt{2}]^T$ | $W_7^{\{1\}}$ | $W_7^{\{13\}}/\sqrt{2}$ | $W_7^{\{134\}}/\sqrt{3}$ | $W_7^{\{1324\}}/2$ |
| 8 | $u_8 = [1\ -1\ 1\ 1]^T$ | $W_8^{\{1\}}$ | $W_8^{\{12\}}/\sqrt{2}$ | $W_8^{\{124\}}/\sqrt{3}$ | $W_8^{\{1234\}}/2$ |
| 9 | $u_9 = [1\ -j\ -1\ -j]^T$ | $W_9^{\{1\}}$ | $W_9^{\{14\}}/\sqrt{2}$ | $W_9^{\{134\}}/\sqrt{3}$ | $W_9^{\{1234\}}/2$ |
| 10 | $u_{10} = [1\ 1\ 1\ -1]^T$ | $W_{10}^{\{1\}}$ | $W_{10}^{\{13\}}/\sqrt{2}$ | $W_{10}^{\{123\}}/\sqrt{3}$ | $W_{10}^{\{1324\}}/2$ |
| 11 | $u_{11} = [1\ j\ -1\ j]^T$ | $W_{11}^{\{1\}}$ | $W_{11}^{\{13\}}/\sqrt{2}$ | $W_{11}^{\{134\}}/\sqrt{3}$ | $W_{11}^{\{1324\}}/2$ |
| 12 | $u_{12} = [1\ -1\ -1\ 1]^T$ | $W_{12}^{\{1\}}$ | $W_{12}^{\{12\}}/\sqrt{2}$ | $W_{12}^{\{123\}}/\sqrt{3}$ | $W_{12}^{\{1234\}}/2$ |
| 13 | $u_{13} = [1\ -1\ 1\ -1]^T$ | $W_{13}^{\{1\}}$ | $W_{13}^{\{13\}}/\sqrt{2}$ | $W_{13}^{\{123\}}/\sqrt{3}$ | $W_{13}^{\{1324\}}/2$ |
| 14 | $u_{14} = [1\ 1\ -1\ -1]^T$ | $W_{14}^{\{1\}}$ | $W_{14}^{\{13\}}/\sqrt{2}$ | $W_{14}^{\{123\}}/\sqrt{3}$ | $W_{14}^{\{3214\}}/2$ |
| 15 | $u_{15} = [1\ 1\ 1\ 1]^T$ | $W_{15}^{\{1\}}$ | $W_{15}^{\{12\}}/\sqrt{2}$ | $W_{15}^{\{123\}}/\sqrt{3}$ | $W_{15}^{\{1234\}}/2$ |

In Table 5, $W_n^{\{s\}}$ is determined by a set $\{s\}$ from an equation expressed as $W_n = I - 2u_n u_n^H / u_n^H u_n$ where I is a 4×4 identity matrix and $u_n$ is given by Table 5.

As indicated in Table 4, a codebook for two transmit antennas includes a total of 7 precoding vectors/matrices. In this case, since an identity matrix is used for an open-loop system, the number of precoding vectors/matrices for precoding of a closed-loop system is 6. A codebook for 4Tx antennas as shown in Table 5 includes 64 precoding vectors/matrices in total.

Such a codebook has common properties such as a Constant Modulus (CM) property, a nested property, and a constrained alphabet property. The CM property indicates that elements of each of all precoding matrices in a codebook do not include '0' and have the same size. The nested property indicates that a precoding matrix of a low rank is designed to be configured with a subset of a specific column of a precoding matrix of a high rank. The constrained alphabet property means that elements of each of all precoding matrices in a codebook are limited. For example, elements of a precoding matrix may be restricted to elements ±1 used for Binary Phase Shift Keying (BPSK), elements ±1,±j used for Quadrature Phase Shift Keying (QPSK), or elements $$\pm 1, \pm j, \pm \frac{(1+j)}{\sqrt{2}}, \pm \frac{(-1+j)}{\sqrt{2}}$$

used for 8-Phase Shift Keying (8-PSK). Since, in the example of the codebook of Table 5, alphabets of elements of each of all precoding matrices in the codebook are configured with $$\left\{ \pm 1, \pm j, \pm \frac{(1+j)}{\sqrt{2}}, \pm \frac{(-1+j)}{\sqrt{2}} \right\},$$

the codebook has the constrained alphabet property.

Feedback Channel Structure

Basically, since a BS cannot be aware of information about a downlink channel in an FDD system, the BS uses channel information fed back by a UE for downlink transmission. In a legacy 3GPP LTE release-8/9 system, the UE may feed back downlink channel information through a PUCCH or a PUSCH. The UE periodically feeds back the downlink channel information through the PUCCH and aperiodically feeds back the downlink channel information through the PUSCH at the request of the BS. Channel information about a whole allocated frequency band (i.e. wideband (WB)) may be fed back or channel information about a specific number of RBs (i.e. subband (SB)) may be fed back.

Extended Antenna Configuration

Figure 23:
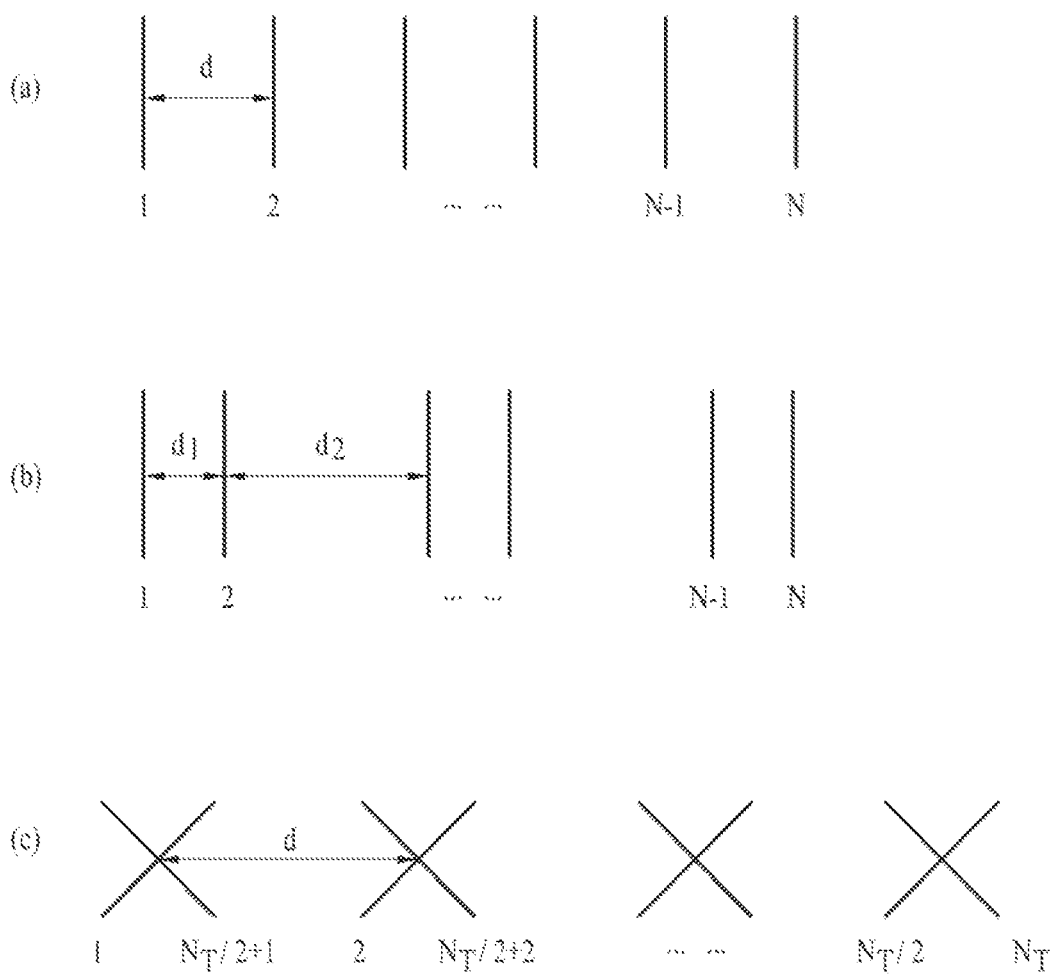
FIG. 23 is a diagram illustrating examples of configuring 8Tx antennas.

FIG. 23 illustrates examples of configuring 8Tx antennas.

FIG. 23(a) illustrates the case in which N antennas configure independent channels without being grouped and this is generally referred to as a Uniform Linear Array (ULA). When a few number of antennas is present, such a ULA configuration may be used. However, when a large number of antennas is present, the space of a transmitter and/or a receiver in configuring independent channels by spatially separating a plurality of antennas may be insufficient.

FIG. 23(b) illustrates a paired ULA configuration in which two antennas are paired. In this case, associated channels may be formed between a pair of two antennas and independent channels may be formed between antennas of a different pair.

Meanwhile, as opposed to the case in which 4Tx antennas are used in downlink in the legacy 3GPP LTE release-8/9 system, 8Tx antennas may be used in downlink in a 3GPP LTE release-10 system. To apply such an extended antenna configuration, since a plurality of antennas should be installed in limited space, the ULA antenna configuration as shown in FIGS. 23(a) and 23(b) may not be appropriate. Accordingly, it may be considered to apply a dual-pole (or cross-pole) antenna configuration as shown in FIG. 23(c). Such a transmit antenna configuration allows an independent channel configuration by lowering an antenna correlation even though a distance d between antennas is relatively short, thereby making it possible to transmit data at high throughput.

Codebook Structure

A transmitter and a receiver may share a predefined codebook and thus efficient precoding may be applied because overhead generated when the receiver feeds back precoding information which is to be used for MIMO transmission by the transmitter can be lowered.

As an example of configuring the predefined codebook, a precoder matrix may be configured using a Discrete Fourier Transform (DFT) matrix or a Walsh matrix. Alternatively, various types of precoders may be configured through combination with a phase shift matrix or a phase shift diversity matrix.

In configuring a DFT matrix based codebook, an n×n DFT matrix may be defined as indicated by the following Equation 3.

$$DFTn: D_n(k, l) = \frac{1}{\sqrt{n}} \exp(-j2\pi kl/n), \quad \text{[Equation 3]}$$

$$k, l = 0, 1, \ldots, n-1$$

The DFT matrix of Equation 3 includes only one matrix with respect to a specific size n. Hence, it may be considered to additionally configure a rotated version of a DFTn matrix in order to properly define and use various precoding matrices according to situation. The following Equation 4 indicates an exemplary rotated DFTn matrix.

$$\text{rotated } DFTn: D_n^{(G,g)}(k, l) = \frac{1}{\sqrt{n}} \exp(-j2\pi k(l+g/G)/n), \quad \text{[Equation 4]}$$

$$k, l = 0, 1, \ldots, n-1,$$

$$g = 0, 1, \ldots, G.$$

If the DFT matrix as indicated by Equation 4 is configured, G rotated DFTn matrices may be generated and the generated DFT matrices satisfy a DFT matrix property.

Next, a Householder-based codebook structure will be explained. The Householder-based codebook structure refers to a codebook comprised of Householder matrices. A Householder matrix is a matrix used for Householder transformation. Householder transformation is a linear transformation and may be used to perform QR decomposition. QR decomposition refers to decomposing a certain matrix into an orthogonal matrix (Q) and an upper triangular matrix (R). The upper triangular matrix indicates a square matrix in which elements below a main diagonal component are all 0. An example of a 4×4 Householder matrix is indicated by the following Equation 5.

$$M_1 = I_4 - 2u_0 u_1^H / \|u_0\|^2 = \frac{1}{\sqrt{4}} * \begin{bmatrix} 1 & 1 & 1 & 1 \\ 1 & 1 & -1 & -1 \\ 1 & -1 & 1 & -1 \\ 1 & -1 & -1 & 1 \end{bmatrix}, \quad \text{[Equation 5]}$$

$$\text{Where } u_0^T = [\,1 \quad -1 \quad -1 \quad -1\,].$$

A 4×4 unitary matrix having a CM property may be generated by Householder transformation. As shown in the codebook for 4Tx antennas in Table 5, an n×n precoding matrix may be generated using Household transformation and a column subset of the generated precoding matrix may be used as a precoding matrix for rank transmission less than n.

Generation of Multicodebook-Based Precoder

A precoding operation used for multiantenna transmission may be explained as an operation of mapping signals transmitted through layers to antennas. That is, Y transmit layers (or streams) may be mapped to X transmit antennas by an X×Y precoding matrix.

To configure an $N_t \times R$ precoding matrix used for transmitting R streams (i.e. a rank R) through $N_t$ transmit antennas, a transmitter may receive one or more PMIs which are fed back by a receiver to configure the precoder matrix. The following Equation 6 indicates an example of a codebook composed of $n_c$ matrices.

$$P_{N_t \times R}(k) \in \{P_1^{N_t \times R}, P_2^{N_t \times R}, P_3^{N_t \times R}, \ldots, P_{n_c}^{N_t \times R}\} \quad \text{[Equation 6]}$$

In Equation 6, k denotes a specific resource index (a subcarrier index, a virtual resource index, or a subband index). Equation 6 may be configured in the form of Equation 7.

$$P_{N_t \times R}(k) = \begin{bmatrix} P_{M_t \times R, 1} \\ P_{M_t \times R, 2} \end{bmatrix}, \quad \text{[Equation 7]}$$

$$N_t = 2 \cdot M_t$$

In Equation 7, $P_{M_t \times R, 2}$ may be configured by shifting $P_{M_t \times R, 1}$ by a specific complex weight $w_2$. Accordingly, a difference between $P_{M_t \times R, 1}$ and $P_{M_t \times R, 2}$ may be expressed as a complex weight as follows.

$$P_{N_t \times R}(k) = \begin{bmatrix} w_1 \cdot P_{M_t \times R, 1} \\ w_2 \cdot P_{M_t \times R, 1} \end{bmatrix} \quad \text{[Equation 8]}$$

Equation 8 may be expressed by Equation 9 using a Kronecker product (denoted by ⊗).

$$P_{N_t \times R, n, m}(k) = \begin{bmatrix} w_1 \\ w_2 \end{bmatrix} \otimes P_{M_t \times R, 1} = W_n \otimes P_m \quad \text{[Equation 9]}$$

The Kronecker product is an operation on two matrices of arbitrary size, resulting in a block matrix. For example, the Kronecker product A⊗B of an m×n matrix A and a p×q matrix B may be expressed as Equation 10. In Equation 10, $a_{mn}$ denotes an element of the matrix A and $b_{pq}$ denotes an element of the matrix B.

$$A \otimes B \begin{bmatrix} a_{11}b_{11} & a_{11}b_{12} & \cdots & a_{11}b_{1q} & \cdots & \cdots & a_{1n}b_{11} & a_{1n}b_{12} & \cdots & a_{1n}b_{1q} \\ a_{11}b_{21} & a_{11}b_{22} & \cdots & a_{11}b_{2q} & \cdots & \cdots & a_{1n}b_{21} & a_{1n}b_{22} & \cdots & a_{1n}b_{2q} \\ \vdots & \vdots & \ddots & \vdots & & & \vdots & \vdots & \ddots & \vdots \\ a_{11}b_{p1} & a_{11}b_{p2} & \cdots & a_{11}b_{pq} & \cdots & \cdots & a_{1n}b_{p1} & a_{1n}b_{p2} & \cdots & a_{1n}b_{pq} \\ \vdots & \vdots & & \vdots & \ddots & & \vdots & \vdots & & \vdots \\ \vdots & \vdots & & \vdots & & \ddots & \vdots & \vdots & & \vdots \\ a_{m1}b_{11} & a_{m1}b_{12} & \cdots & a_{m1}b_{1q} & \cdots & \cdots & a_{mn}b_{11} & a_{mn}b_{12} & \cdots & a_{mn}b_{1q} \\ a_{m1}b_{21} & a_{m1}b_{22} & \cdots & a_{m1}b_{2q} & \cdots & \cdots & a_{mn}b_{21} & a_{mn}b_{22} & \cdots & a_{mn}b_{2q} \\ \vdots & \vdots & \ddots & \vdots & & & \vdots & \vdots & \ddots & \vdots \\ a_{m1}b_{p1} & a_{m1}b_{p2} & \cdots & a_{m1}b_{pq} & \cdots & \cdots & a_{mn}b_{p1} & a_{mn}b_{p2} & \cdots & a_{mn}b_{pq} \end{bmatrix}$$

[Equation 10]

In Equation 9, a submatrix of a precoding, $$\begin{bmatrix} w_1 \\ w_2 \end{bmatrix},$$

and $P_{M_r \times R, 1}$ may be independently fed back from the receiver and the transmitter may configure a precoder as indicated by Equation 8 or Equation 9 using the feedback information. When Equation 8 or Equation 9 is applied, W is always configured in the form of a 2×1 vector and may be configured in a codebook form as indicated by the following Equation 11.

$$W \in \begin{bmatrix} 1 \\ e^{j\frac{2\pi}{N}i} \end{bmatrix}, i = 0, \ldots, N-1 \qquad \text{[Equation 11]}$$

In Equation 11, N is the total number of precoding vectors included in a codebook and i may be used as an index of a vector. To obtain proper performance while minimizing feedback overhead, i may be fixed to 2, 4, or 8. In addition, $P_{M_r \times R, 1}$ may be configured by a codebook for 4Tx antennas or 2Tx antennas which may use the codebook (a codebook for 2Tx or 4Tx antennas used in 3GPP LTE release-8/9) of Table 4 or Table 5 or may be configured in a rotated DFT form.

The W matrix may take the form of a 2×2 matrix. Equation 12 indicates an example of the 2×2 W matrix.

$$P_{N_t \times 2R, n, m}(k) = \begin{bmatrix} w_1 & w_3 \\ w_2 & w_4 \end{bmatrix} \otimes P_{M_t \times R, 1} = W_n \otimes P_m, N_t = 2 \cdot M_t \qquad \text{[Equation 12]}$$

If the W matrix is configured as indicated by Equation 12, a codebook may be designed up to a rank of 2R when a maximum rank of the $P_{M_r \times R, 1}$ codebook is R. For example, if the codebook of Table 4 is used as $P_{M_r \times R, 1}$, up to rank 4 (R=4) may be used as a maximum rank according to Equation 9. Meanwhile, up to rank 8 (2R=8) may be used as the maximum rank according to Equation 12. Therefore, a precoder may be configured such that 8×8 transmission can be performed in a system configuring 8Tx antennas. In this case, W may be configured in the form of a codebook as indicated by the following Equation 13.

$$W \in \begin{bmatrix} 1 & 1 \\ e^{j\frac{2\pi}{N}i} & -e^{j\frac{2\pi}{N}i} \end{bmatrix}, i = 0, \ldots, N-1 \qquad \text{[Equation 13]}$$

The precoder configuration schemes of Equation 9 and Equation 12 may be differently applied according to each rank. For example, the scheme of Equation 9 may be used for rank 4 or less (R≤4) and the scheme of Equation 12 may be used for rank 5 or more (R≥5). In addition, the scheme of Equation 9 may be used only for rank 1 (R=1) and the scheme of Equation 12 may be used for the other cases (rank 2 or more (R≥2)). W and P described in association with Equation 9 and Equation 12 may be fed back to have the characteristics shown in the following Table 6.

TABLE 6

| Case | W/P |
|---|---|
| Frequency granularity 1 | One of two matrices may be fed back in subband and the other may be fed back in wideband. |
| Frequency granularity 2 | One of two matrices may be fed back with respect to best-M subband and the other may be fed back in wideband. |
| Time granularity | One of two matrices may be fed back at intervals of N and the other may be fed back at intervals of M |
| Feedback channel 1 | One of two matrices may fed back on PUSCH and the other may be fed back on PUCCH |
| Feedback channel 2 | During feedback on PUSCH, one (e.g. W) of two matrices is fed back in subband and the other (e.g. P) may be fed back in wideband. During feedback on PUCCH, both W and P may be fed back in wideband. |
| Unequal protection | One (e.g. P) of two matrices may be coded at code rate having higher reliability and the other (e.g. W) may be coded at code rate having relatively low reliability. |
| Alphabet restriction 1 | Alphabets of W matrix may be restricted to BPSK and alphabets of P matrix may be restricted to QPSK or 8 PSK. |
| Alphabet restriction 2 | Alphabets of W matrix may be restricted to QPSK and alphabets of P matrix may be restricted to QPSK or 8 PSK. |

Next, a multicodebook-based precoder having a nested property will be described.

A codebook may be configured by appropriately using the schemes of Equation 9 and Equation 12. However, if two combinations are not used, it may be impossible to configure precoders according to situations. To solve such a problem, the following Equation 14 may be used to configure a precoder.

$$P_{N_t \times N_t, n, m} = \begin{bmatrix} w_1 & w_3 \\ w_2 & w_4 \end{bmatrix} \otimes P_{M_t \times M_t} = W_n \otimes P_m, N_t = 2 \cdot M_t \qquad \text{[Equation 14]}$$

A precoder for the case in which a rank value is equal to the number of transmit antennas (R=$N_t$) may be configured using $P_{N_t \times N_t}$ obtained from Equation 14 and a column subset of the configured precoder may be used as a precoder for a lower rank. Since such a precoder configuration scheme satisfies a nested property, CQI calculation may be simplified. In Equation 14, $P_{N_t \times N_{t,n,m}}$ denotes a precoder when $R=N_t$. For example, a precoder for $R=2$ may use a subset comprised of the zeroth and second columns of $P_{N_t \times N_{t,n,m}}$ and may be expressed as $P_{N_t \times N_{t,n,m}}(0,2)$. In this case, $P_{M_t \times M_t}$ may be configured by a rotated DFT matrix or another type of codebook.

To raise a diversity gain in an open-loop environment, a precoder may be changed according to a specific radio resource based on the precoder configured by the above-described scheme to maximize a beam diversity gain. For example, if a precoder according to the scheme of Equation 9 is used, a precoder application scheme according to a specific resource may be expressed as indicated by Equation 15.

$$P_{N_t \times R, n, m}(k) = W_{k \bmod n_c} \otimes P_{k \bmod m_c} \qquad \text{[Equation 15]}$$

In Equation 15, k denotes a specific resource region. A precoding matrix for the specific resource region k is determined by a modulo operation as indicated by Equation 15. In this case, $n_c$ and $m_c$ may indicate the size of a codebook for a W matrix and the size of a codebook for a P matrix, respectively, or may indicate a subset of the W matrix and a subset of the P matrix, respectively.

If both matrices are cycled as in Equation 15, diversity gain can be maximized but the complexity of the configuration of a precoder increases. Accordingly, a precoder may be configured such that one of the W and P matrices is cycled in the long term and the other matrix is cycled in the short term.

For example, the W matrix may be configured by a modulo operation according to a PRB index and the P matrix may be configured by a modulo operation according to a subframe index. Alternatively, the W matrix may be configured by a modulo operation according to a subframe index and the P matrix may be configured by a modulo operation according to a PRB index.

As another example, the W matrix may be configured by a modulo operation according to a PRB index and the P matrix may be configured by a modulo operation according to a subband index. Alternatively, the W matrix may be configured by a modulo operation according to a subband index and the P matrix may be configured by a modulo operation according to a PRB index.

Alternatively, precoder cycling using a modulo operation may be applied only to one of the two matrices and the other one may use a fixed form.

Method for Improving Precoding Performance Using Multicodebook

In a legacy wireless communication system, a precoding matrix may be determined using a predefined single codebook. If the predefined single codebook is used, wider variety of antenna configurations, beam directions, etc. may be reflected as the number of precoding matrices included in the codebook increases. In other words, as the number of precoding matrices included in the codebook increases, a precoding matrix capable of well reflecting various beam directions formed by a transmit antenna may be used. This may be expressed as high beam resolution or high codebook resolution. To support precoding of higher beam resolution, more precoding matrices need to be included in a codebook. However, if the number of precoding matrices included in the codebook increases, control signal overhead for indicating the precoding matrices in the codebook increases. Accordingly, a scheme for determining a precoding matrix that a MIMO transmitter is to use in the form of a combination of multiple codebooks may be applied as a method for raising codebook resolution without greatly increasing control signal overhead.

A multicodebook scheme may include a scheme for determining a precoding matrix W that a MIMO transmitter is to use by a combination of two precoding matrices, for example. The two precoding matrices may be referred to as a first precoding matrix W1 and a second precoding matrix W2. The first precoding matrix W1 may be determined by one or more precoding matrices constituting a first codebook. Similarly, the second precoding matrix W2 may be determined by one or more precoding matrices constituting a second codebook. If the precoding matrix W to be used by the MIMO transmitter is determined by a combination of the first precoding matrix W1 and the second precoding matrix W2, a relationship between the precoding matrices may be defined as W=W1W2.

For example, the first precoding matrix W1 may be a covariance matrix, a phase diagonal matrix, a block diagonal matrix, etc. and may be defined as a matrix of NtxNt size where Nt is the number of transmit antennas. Meanwhile, the second precoding matrix W2 may be defined as a precoder selected from a conventional single codebook. For example, a codebook from which W2 is selected may use a single codebook for a 2Tx or 4Tx antenna configuration defined in a legacy LTE system (an LTE release-8 or release-9 system) as shown in Table 4 or Table 5. Alternatively, the codebook from which W2 is selected may use a single codebook defined in a legacy arbitrary wireless communication system in addition to the LTE system.

If W1 and W2 are defined as described above, an actual channel property (a beam direction, a phase, etc.) may be precisely and accurately reflected. That is, a channel property may be reflected (or compensated) such that a channel indicated by the precoding matrix W2 of the conventional 2Tx or 4Tx single codebook approximates to an actual channel by the precoding matrix W1. Accordingly, since the precoding matrix W determined by W1×W2 may have high resolution by extension of the conventional 2Tx or 4Tx single codebook, an actual channel property can be more accurately reflected.

The precoding matrix W1 may be configured in a codebook form by the following scheme. As an example, the codebook may be configured by matrices indicating a correlation between antennas and a difference of phase rotation by approximating a covariance matrix of a channel so as to reflect a channel according to a ULA configuration or a cross-pole antenna configuration. Alternatively, an Eigen vector may be selected from a covariance matrix to express the Eigen vector as a codebook. In this case, the scheme of compensating for a channel using Eigen vector has an advantage of effectively compensating for the channel even though a small number of codebook elements is defined (i.e. even though a codebook size is small).

Examples of the present invention for a multicodebook configuration capable of raising precoding performance by a combination of multiple codebooks will be described below. In various examples of the present invention, the precoding matrix W used by the MIMO transmitter may be defined by a combination of a precoding matrix (first matrix) selected from one codebook and a precoding matrix (second matrix) selected from another codebook. For example, the precoding matrix W determined by a combination of multiple codebooks according to the present invention may be indicated by Equation 16.

$$W = RW_1 \qquad \text{[Equation 16]}$$

In Equation 16, R is defined as a phase diagonal matrix. A diagonal matrix refers to a matrix in which elements except for elements on a main diagonal in a square matrix are all zero. For example, if an element of an i-th row and a j-th column of an n×n matrix D is $d_{i,j}$ (i,j {1, 2, 3, . . . , n}), the diagonal matrix may be defined as $d_{i,j}=0$ when i≠j. In addition, if main diagonal elements are configured as a1, a2, a3 starting from the left top, the diagonal matrix may be expressed as diag(a1, a2, a3). When a1, a2, a3 are expressed as a vector A, the diagonal matrix may be expressed as diag (A). A phase diagonal matrix refers to a matrix in which elements on a main diagonal of the diagonal matrix have the same and/or different phase values.

Meanwhile, $W_1$ indicates a precoding matrix selected from an arbitrary single codebook. For example, a codebook from which $W_1$ is selected may use a single codebook for a 2Tx or 4Tx antenna configuration defined in the legacy LTE system (an LTE release-8 or release-9 system) as shown in Table 4 or Table 5 or may use a single codebook defined in a legacy arbitrary wireless communication system as well as the LTE system. In the present invention, $W_1$ may be a precoding matrix selected from a conventional codebook.

In the following description, a codebook which is a set of candidates of the precoding matrix W is referred to as a W codebook, a codebook which is a set of candidates of the diagonal matrix R is referred to as an R codebook, and a codebook which is a set of candidates of the precoding matrix $W_1$ is referred to as a $W_1$ codebook.

Hereinafter, exemplary embodiments of the present invention for a codebook configuration will be described when the precoding matrix W is defined as indicated by the above Equation 16. Specifically, exemplary embodiments of the present invention for configuring elements of the phase diagonal matrix R in Equation 16 will be described.

Embodiment 1

When the precoding matrix W is expressed by $W=RW_1$ as indicated in Equation 16, elements of the phase diagonal matrix R may be defined as indicated by Equation 17.

$$R = \mathrm{diag}(A)R:Ntx \times Ntx, A:Ntx \times 1 \quad \text{[Equation 17]}$$

Equation 17 represents that main diagonal elements of the phase diagonal matrix R are composed of elements of a vector A. The phase diagonal matrix R has a size of Ntx×Ntx and the vector A has a size of Ntx×1. Ntx denotes the number of transmit antennas. The vector A may be calculated from an arbitrary single precoder vector or may be calculated by a combination of multiple codebooks. A method for calculating the vector A will be described in detail hereinbelow.

For example, the vector A may be determined by one vector of an N-DFT matrix (an N-point DFT matrix, or a DFTn matrix for a specific size n as indicated by Equation 3). For example, when the number of transmit antennas is 4 (N=4), a 4-DFT matrix may be expressed as follows.

$$4\text{-}DFT = \frac{1}{\sqrt{4}} \begin{bmatrix} e^{\frac{-j 2\pi \cdot 0 \cdot 0}{4}} & e^{\frac{-j 2\pi \cdot 0 \cdot 1}{4}} & e^{\frac{-j 2\pi \cdot 0 \cdot 2}{4}} & e^{\frac{-j 2\pi \cdot 0 \cdot 3}{4}} \\ e^{\frac{-j 2\pi \cdot 1 \cdot 0}{4}} & e^{\frac{-j 2\pi \cdot 1 \cdot 1}{4}} & e^{\frac{-j 2\pi \cdot 1 \cdot 3}{4}} & e^{\frac{-j 2\pi \cdot 1 \cdot 4}{4}} \\ e^{\frac{-j 2\pi \cdot 2 \cdot 0}{4}} & e^{\frac{-j 2\pi \cdot 2 \cdot 1}{4}} & e^{\frac{-j 2\pi \cdot 2 \cdot 2}{4}} & e^{\frac{-j 2\pi \cdot 2 \cdot 3}{4}} \\ e^{\frac{-j 2\pi \cdot 3 \cdot 0}{4}} & e^{\frac{-j 2\pi \cdot 3 \cdot 1}{4}} & e^{\frac{-j 2\pi \cdot 3 \cdot 2}{4}} & e^{\frac{-j 2\pi \cdot 3 \cdot 3}{4}} \end{bmatrix} \quad \text{[Equation 18]}$$

$$= \frac{1}{2} \begin{bmatrix} 1 & 1 & 1 & 1 \\ 1 & -j & -1 & j \\ 1 & -1 & 1 & -1 \\ 1 & j & -1 & -j \end{bmatrix}$$

In Equation 18, the 4-DFT matrix is composed of 4 column vectors {1, 1, 1, 1}, {1, −j, −1, j}, {1, −1, 1, −1}, and {1, j, −1, −j}. One of the column vectors may be used for a single precoder vector of the vector A of Equation 17. For example, if the vector A is {1, −j, −1, j}, the phase diagonal matrix R may be configured as indicated by the following Equation 19.

$$R = \begin{bmatrix} 1 & 0 & 0 & 0 \\ 0 & -j & 0 & 0 \\ 0 & 0 & -1 & 0 \\ 0 & 0 & 0 & j \end{bmatrix} \quad \text{[Equation 19]}$$

Equation 19 is purely exemplary and an arbitrary vector of a DFT matrix of arbitrary size may be used for the vector A of Equation 17 to configure the phase diagonal matrix R.

As another example, the vector A of Equation 17 may be defined as an arbitrary vector of a codebook defined in a legacy wireless communication system. For example, one of vectors constituting an arbitrary precoding matrix in a codebook defined in the 3GPP LTE release-8 or release-9 system (e.g. the codebook as shown in Table 4 or Table 5) or a codebook defined in an IEEE 802.16e or 802.16m system may be used as the vector A of Equation 17.

As another example, the vector A of Equation 17 may be calculated by a combination of multiple codebooks. For instance, if one precoding matrix is determined by a combination of two codebooks similarly to description of Equation 6 to Equation 9, one of vectors constituting the precoding matrix may be used as the vector A of Equation 17. For example, an Nt×R precoding matrix used for MIMO transmission when the number of transmit antennas is Nt and a rank value is R may be expressed as indicated by Equation 20.

$$P_{N_t \times R}(k) = \begin{bmatrix} w_1 \cdot P_{M_t \times R, 1} \\ w_2 \cdot P_{M_t \times R, 1} \end{bmatrix} \quad \text{[Equation 20]}$$

In Equation 20, k denotes a specific resource index (e.g. a subcarrier index, a virtual resource index, or a subband index) and Nt=2Mt. Since the precoding matrix $P_{N_t \times R}(k)$ of Equation 20 takes a form in which complex weights $w_1$ and $w_2$ are applied to a matrix of $M_t \times R, 1$ size, the precoding matrix may be expressed as a combination of two matrices (i.e. a combination of matrices selected respectively from two codebooks) as indicated by Equation 21 or Equation 22.

$$P_{N_t \times R, n, m}(k) = \begin{bmatrix} P_{M_t \times R, 1} & 0 \\ 0 & P_{M_t \times R, 1} \end{bmatrix} \begin{bmatrix} w_1 \\ w_2 \end{bmatrix} \quad \text{[Equation 21]}$$

$$P_{N_t \times R, n, m}(k) = \begin{bmatrix} w_1 \\ w_2 \end{bmatrix} \otimes P_{M_t \times R, 1} = W_n \otimes P_m \quad \text{[Equation 22]}$$

Equation 20 to Equation 22 are purely exemplary and one of vectors constituting a precoding matrix determined by a combination of two arbitrary codebooks may be used as the vector A of Equation 17.

Thus, one of vectors constituting a precoding matrix determined by a single precoding matrix or a combination of multiple codebooks may be used as a vector constituting main diagonal elements of the phase diagonal matrix R. Therefore, a more precise precoding matrix can be calculated by combining the phase diagonal matrix R with the precoding matrix $W_1$ selected from a codebook defined in the legacy wireless communication system as indicated by Equation 16. That is, codebook resolution increases by introducing the phase diagonal matrix R while reusing the conventionally defined codebook and thus excellent performance can be supported in an MU-MIMO operation as well as in an SU-MIMO operation.

Embodiment 2

When the precoding matrix w is expressed by $W=RW_1$ as indicated in Equation 16, elements of the phase diagonal matrix R may be defined as indicated by Equation 23

$$R=\text{diag}(A)\text{diag}(B)R:Ntx \times Ntx, A,B:Ntx \times 1 \quad \text{[Equation 23]}$$

Equation 23 represents that the phase diagonal matrix R is configured by a combination of two diagonal matrices (i.e. diag(A) and diag(B)). When the number of transmit antennas is Ntx, each of vectors A and B has a size of Ntx×1 and each of the diagonal matrices diag(A) and diag(B) has a size of Ntx×Ntx. A result obtained by multiplying two diagonal matrices of Ntx×Ntx size is a diagonal matrix of Ntx×Ntx size. Namely, the matrix R is a diagonal matrix of Ntx×Ntx size.

The vector A may be determined according to the following methods.

As one example, when the number of transmit antennas is N, the vector A may correspond to one of vectors constituting an N-DFT matrix. For example, the vector A may be configured according to a principle similar to the example of Equation 18 and Equation 19.

As another example, if the number of transmit antennas is N, the vector A may be configuring by concatenating one of vectors constituting an N/2-DFT matrix. For example, if the number of transmit antennas is 4 (N=4), N/2=2 and a 2-DFT matrix may be expressed by Equation 24.

$$2-DFT = \frac{1}{\sqrt{2}}\begin{bmatrix} e^{\frac{-j\cdot 2\pi \cdot 0 \cdot 0}{2}} & e^{\frac{-j\cdot 2\pi \cdot 0 \cdot 1}{2}} \\ e^{\frac{-j\cdot 2\pi \cdot 1 \cdot 0}{2}} & e^{\frac{-j\cdot 2\pi \cdot 1 \cdot 1}{2}} \end{bmatrix} \quad \text{[Equation 24]}$$

$$= \frac{1}{\sqrt{2}}\begin{bmatrix} 1 & 1 \\ 1 & -1 \end{bmatrix}$$

In Equation 24, the 2-DFT matrix is composed of two column vectors {1, 1} and {1, −1}. A length-4 vector {1, −1, 1, −1} may be configured by concatenating one length-2 vector {1, −1} of the two column vectors and the length-4 vector {1, −1, 1, −1} may be used as the vector A. In this case, the diagonal matrix diag(A) may be configured as follows.

$$\text{diag}(A) = \begin{bmatrix} 1 & 0 & 0 & 0 \\ 0 & -1 & 0 & 0 \\ 0 & 0 & 1 & 0 \\ 0 & 0 & 0 & -1 \end{bmatrix} \quad \text{[Equation 25]}$$

Meanwhile, the vector B may be determined according to the following methods.

As one example, if the number of transmit antennas is N, the vector B may correspond to one of vectors constituting an N-DFT matrix. For example, the vector B may be configured according to a principle similar to the example of Equation 18 and Equation 19.

As another example, the vector B may be configured in the form of repeating a specific element. For example, if the number of transmit antennas is 4 (Ntx=4), the vector B may be configured by repeating a specific element indicated by Equation 26.

$$\begin{bmatrix} 1 \\ a \\ 1 \\ a \end{bmatrix}, \begin{bmatrix} 1 \\ 1 \\ a \\ a \end{bmatrix}, \begin{bmatrix} 1 \\ a \\ 1 \\ b \end{bmatrix}, \begin{bmatrix} 1 \\ 1 \\ a \\ b \end{bmatrix} \quad \text{[Equation 26]}$$

In Equation 26, each of 'a' and 'b' may be 1, −1, j, or −j or may be assigned an arbitrary phase value. Each of 'a' and 'b' may be assigned a proper value according to antenna configuration. Notably, the vector B is configured by a repetitive form of a specific element. When the diagonal matrix diag(B) is configured using the vector B having a repetitive form of a specific element, a channel property caused by an antenna configuration in which an interval between antennas or phase rotation may be not constant or an interval between antennas is repeated can be well reflected.

If the vectors A and B are determined as described above, a combination order of the diagonal matrices diag(A) and diag(B) of the phase diagonal matrix R may be changed unlike Equation 23. Namely, the phase diagonal matrix R may be configured as indicated by Equation 27.

$$R=\text{diag}(B)\text{diag}(A)R:Ntx \times Ntx, A,B: Ntx \times 1 \quad \text{[Equation 27]}$$

If the phase diagonal matrix R is determined by the two diagonal matrices diag(A) and diag(B) according to the present embodiment, a channel property formed by various antenna configurations can be well reflected as compared with use of only the diagonal matrix diag(A).

Embodiment 3

In the above-described exemplary embodiments of the present invention, the methods for configuring elements of phase diagonal matrices included in the R codebook have been described when the W codebook is configured by a combination of a codebook (R codebook) composed of a phase diagonal matrix and a conventional codebook ($W_1$ codebook) as indicated in Equation 16. To raise resolution of the conventional codebook $W_1$, it may be considered to apply a method of combining the phase diagonal matrix codebook (R codebook) with the conventional codebook $W_1$, i.e. a method for determining a precoding matrix in the form of a combination of multiple codebooks according to a specific rank (i.e. the number of MIMO transmission layers).

Determination of the precoding matrix in the form of a combination of multiple codebooks according to rank may be applied, for example, only when a rank value is less than a predetermined value. As an example, if a rank is 1, the precoding matrix may be determined in the form of a combination of multiple codebooks and, if a rank is 2 or more, the precoding matrix may be determined through a single codebook. As another example, the precoding matrix may be determined in the form of a combination of multiple codebooks only when a rank is 2 or less and, for the other ranks, the precoding matrix may be determined in a single codebook. As still another example, the precoding matrix may be determined in the form of a combination of multiple codebooks only when a rank is 4 or less and, for the other ranks, the precoding matrix may be determined in a single codebook.

When a multicodebook combination scheme or a single codebook scheme is applied according to a rank as described above, defining such an operation as separate codebook structures may generate unnecessary overhead. Accordingly, the present invention proposes a method of expressing the multicodebook combination scheme or the single codebook scheme applied according to a rank as one structure.

The precoding matrix W may be defined as $W=RW_1$ with respect to both a rank to which the multicodebook combination scheme is applied and a rank to which the single codebook scheme is applied. The phase diagonal matrix R may be defined as an identity matrix with respect to the rank to which the single codebook scheme is applied so that codebooks for all ranks are defined as one structure (i.e. the multicodebook combination scheme). For instance, the phase diagonal matrix R may be defined as indicated by Equation 28.

$$R = \begin{bmatrix} 1 & 0 & \cdots & 0 \\ 0 & 1 & \cdots & 0 \\ \vdots & \vdots & \ddots & \vdots \\ 0 & 0 & \cdots & 1 \end{bmatrix} \quad \text{[Equation 28]}$$

Even when the matrix R is configured by an identity matrix as shown in Equation 28, the phase diagonal matrix R has a size of Ntx×Ntx as in Equation 17 (where Ntx is the number of transmit antennas). Since $W=RW_1$ according to Equation 16 and R is an identity matrix, $W=W_1$ is satisfied. Therefore, even though the precoding matrix W is defined as a combination of multiple codebooks, W may be operated in the same manner as application of a single codebook $W_1$ to MIMO transmission of a transmitter with respect to a specific rank.

Meanwhile, the phase diagonal matrix R may be a unitary matrix even with respect to a rank (e.g. rank 1) for which the precoding matrix is determined in a combination form of multiple codebooks. For example, if the phase diagonal matrix R is configured based on an arbitrary vector of the N-DFT matrix indicated exemplarily in the aforementioned embodiments 1 and 2, an identity matrix may be included in the R codebook. That is, the identity matrix may be included in a plurality of phase diagonal matrices in the R codebook.

A detailed example of the phase diagonal matrix R for the case where the number of transmit antennas is 4 (Ntx=4) may be indicated as Equation 29 or Equation 30.

$$\text{diag}\{1, e^{j\theta}, e^{j2\theta}, e^{j3\theta}\}, \theta = \pm \frac{\pi}{16}, \pm \frac{\pi}{8} \quad \text{[Equation 29]}$$

$$\text{diag}\{1, 1, \alpha, \alpha\}, \alpha = \pm 1, \pm j \quad \text{[Equation 30]}$$

A phase value is expressed as $e^{-j\theta}$ in Equation 29 and as $\alpha$ in Equation 30 but the phase value is not limited thereto. That is, a prescribed phase value according to antenna configuration in Equation 29 or Equation 30 may be applied.

In the various embodiments of the present invention, if a precoding matrix is determined by a combination of multiple codebooks, a MIMO receiver may feed back control information (e.g. PMIs) indicating respective precoding matrices (i.e. the phase diagonal matrix R and the precoding matrix $W_1$) to a MIMO transmitter. The MIMO receiver (e.g. a UE) may select and report preferred precoding matrices and the MIMO transmitter may determine the precoding matrix $W(=RW_1)$ to be used for MIMO transmission in consideration of the matrices R and $W_1$ reported by the MIMO receiver (e.g. the UE). The BS does not necessarily need to use the matrices R and $W_1$ fed back by the UE and may determine a precoding matrix to be applied to MIMO transmission by selecting proper matrices R and $W_1$.

In this way, precoding information fed back by the MIMO receiver may be determined by a combination of two precoding information items (information about R and $W_1$). Such precoding information may have long term and/or wideband attributes or may have short term and/or subband attributes.

The long term and/or wideband attributes mean that corresponding precoding information reflects an average characteristic in channel frequency and/or time. In other words, channel state information which reflects a long term channel property in time, a wideband channel property in frequency, or a long term channel property in time and at the same time a wideband channel property in frequency may be the precoding information having lone-term and/or wideband attributes. The precoding information having such a characteristic is briefly referred to as the channel state information of long term-wideband attributes (or long term-wideband PMI). Meanwhile, the short term and/or subband attributes mean that corresponding precoding information reflects a relatively instantaneous channel characteristic. In other words, channel state information which reflects a short term channel property in time, a subband channel property in frequency, or a short term channel property in time and at the same time a subband channel property in frequency may be the precoding information having short term and/or subband attributes. The precoding information having such a characteristic is briefly referred to as the channel state information of short term-subband attributes (or short term-subband PMI).

In the aforementioned embodiments, the phase diagonal matrix R may have long term-wideband attributes. The precoding matrix $W_1$ may have short term-subband attributes or long term-wideband attributes. Precoding information of long term-wideband attributes may be less frequently (or at a long period) fed back than precoding information of short term-subband attributes. For example, the phase diagonal matrix R of long term-wideband attributes may be feed back at a longer period than the precoding matrix $W_1$ of short term-subband attributes.

A MIMO transmission/reception method according to an exemplary embodiment of the present invention will now be described with reference to FIG. 24.

In step S2410, a transmitter may determine a precoding matrix used for precoding a signal to be transmitted to a receiver. The transmitter may select a first matrix (the matrix R in the examples of the present invention) from a first codebook associated with a first PMI and select a second matrix (the matrix $W_1$ in the examples of the present invention) from a second codebook associated with a second PMI. The transmitter may determine the precoding matrix W through a combination of R and $W_1$.

The transmitter may receive the first and second PMIs reported by the receiver before step S2410. The first and second PMIs transmitted to the transmitter by the receiver may be generated by measuring, at the receiver, channels from the transmitter to the receiver. The receiver may measure a channel using, for example, an RS transmitted by the transmitter. In step S2410, when the transmitter selects the first matrix R and the second matrix $W_1$ in consideration of the first and second PMIs, the first and second PMIs are information indicating precoding matrices preferred by the receiver in the first and second codebooks. Accordingly, the transmitter may select R and $W_1$ indicated by the first and second PMIs or other proper matrices R and $W_1$ other than the precoding matrices indicated by the first and second PMIs.

The codebooks according to various embodiments of the present invention may be used as the first and second codebooks. The first codebook associated with the first PMI may be comprised of a set of candidates of the matrix R. For example, the first codebook may include one or more diagonal matrices each having N×N size (where N is the number of transmit antennas of the transmitter, N≥2). In the diagonal matrix, elements other than 0, i.e. main diagonal elements, may have prescribed phase values. A detailed example thereof conforms to the aforementioned examples of the present invention. Meanwhile, the second codebook associated with the second PMI may be comprised of a set of candidates of the matrix $W_1$. For example, the second codebook may include one or more matrices each having N×L size (where L is the number of layers to which signals transmitted by the transmitter are mapped, 1≤L≤N). For example, a single codebook defined in the legacy 3GPP LTE release-8 or release-9 system may be used as the second codebook. The transmitter and the receiver may previously share the first and second codebooks.

In step S2420, the transmitter may map a signal to be transmitted to the receiver to L layers.

In step S2430, the transmitter may perform precoding using the precoding matrix W determined in step S2410 with respect to the L layers to which the signal to be transmitted to the receiver is mapped.

In step S2440, the transmitter may transmit the precoded signal to the receiver and the receiver may receive the signal from the transmitter.

In step S2450, the receiver processes the received signal based on the same precoding matrix as the precoding matrix W applied to signal transmission by the transmitter (e.g. performs reverse precoding processing with respect to the received signal) to restore the signal.

Figure 24:
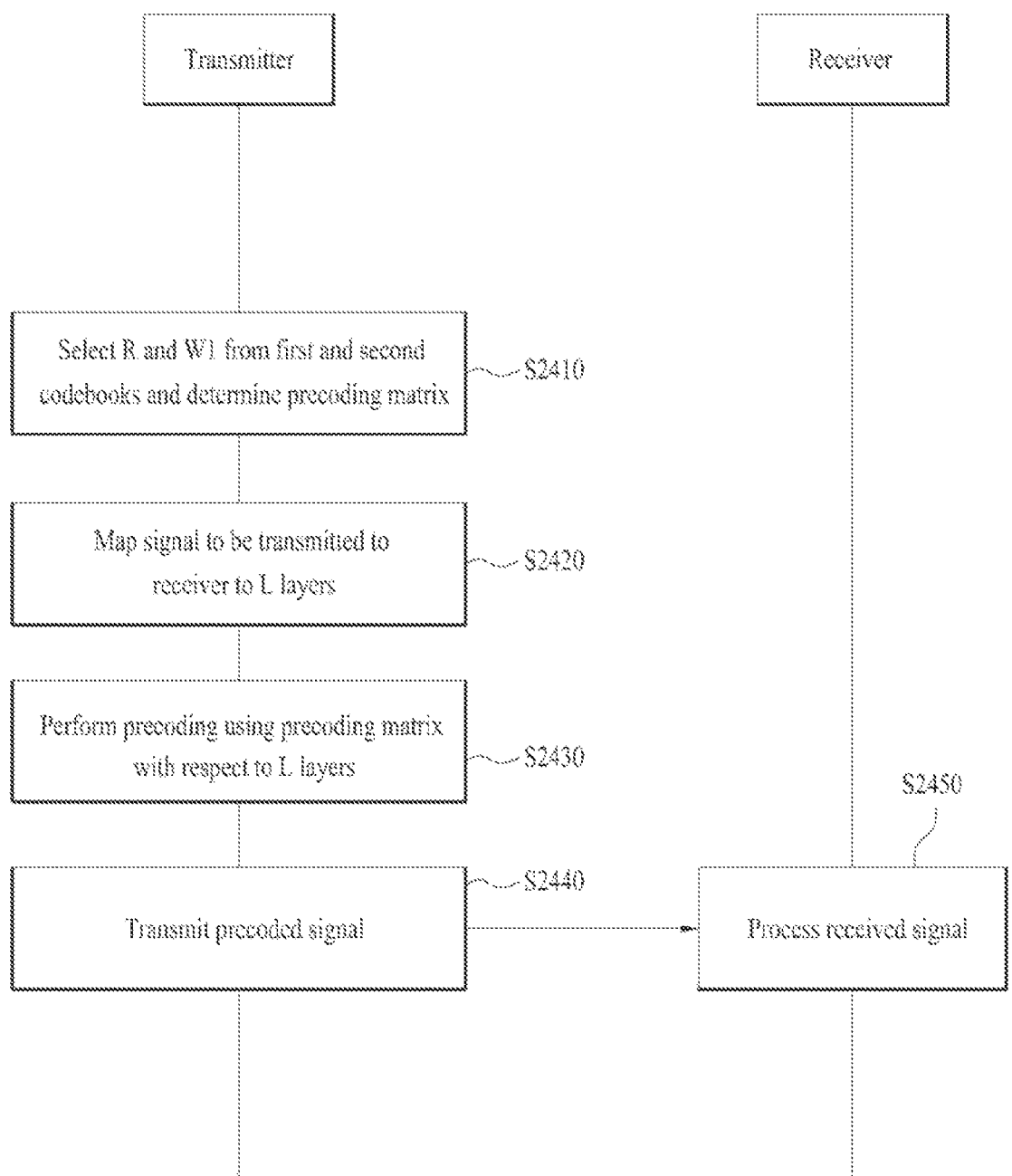
FIG. 24 is a flowchart of a MIMO transmission/reception method according to an exemplary embodiment of the present invention.

The codebook-based precoded signal transmission/reception method of the present invention as shown in FIG. 24 may be implemented such that each of the aforementioned various embodiments of the present invention is independently applied or two or more embodiments of the present invention are simultaneously applied. A repetitive description is omitted for clarity of description.

In the MIMO transmission/reception method of FIG. 24, the transmitter may be a BS and the receiver may be a UE. Alternatively, the transmitter may be the UE and the receiver may be the BS. In this case, feedback of the first and second PMIs to the UE from the BS need not be performed. In addition, the same principle as proposed in the present invention may be applied to MIMO transmission (in backhaul uplink and backhaul downlink) between the BS and a relay and MIMO transmission (in access uplink and access downlink) between the relay and the UE.

Figure 25:
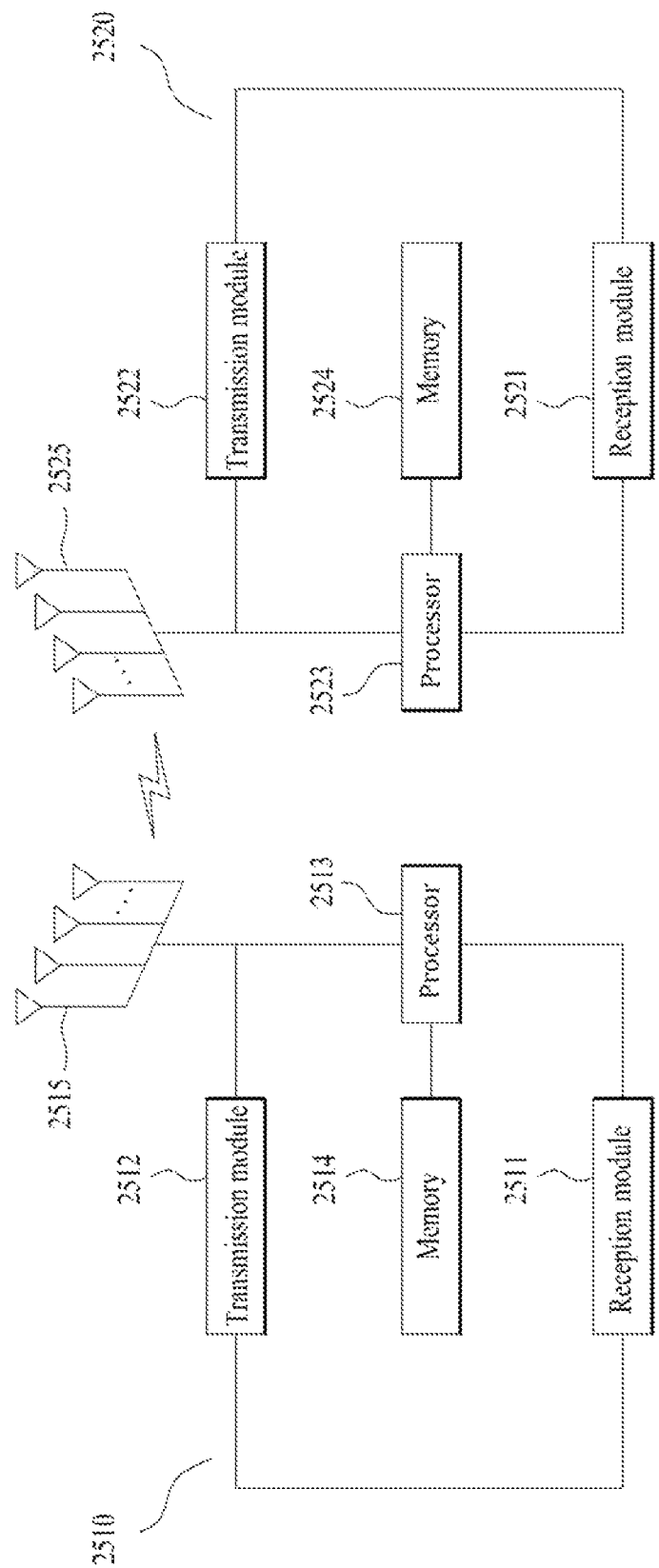
FIG. 25 is a diagram illustrating the configuration of a transmitter and receiver according to an exemplary embodiment of the present invention.

FIG. 25 is a diagram illustrating the configuration of a transmitter and receiver according to an exemplary embodiment of the present invention.

Referring to FIG. 25, a transmitter 2510 according to the present invention may include a reception module 2511, a transmission module 2512, a processor 2513, a memory 2514, and a plurality of antennas 2515. The transmitter 2510 may perform MIMO transmission to a receiver 2520 through the plurality of antennas 2515. The reception module 2511 may receive various signals, data, and information from other devices. The transmission module 2512 may transmit various signals, data, and information to other devices. The processor 2513 may control the overall operation of the transmitter 2510.

The transmitter 2510 according to an exemplary embodiment of the present invention may be configured to transmit a codebook-based precoded signal. The memory 2514 of the transmitter may store the first and second codebooks. The processor 2513 of the transmitter may be configured to select the first matrix R from the first codebook associated with the first PMI, to select the second matrix $W_1$ from the second codebook associated with the second PMI, and to determine the precoding matrix W based on the first matrix R and the second matrix $W_1$. In addition, the processor 2513 may be configured to perform precoding using the determined precoding matrix with respect to L layers (1≤L≤N, where N is the number of transmit antennas 2515 of the transmitter) to which a signal to be transmitted to the receiver 2520 is mapped. The processor 2513 may be configured to transmit the precoded signal to the receiver 2520 through the transmission module 2512 via the N transmit antennas 2515. Here, candidates of the first matrix R included in the first codebook and candidates of the second matrix $W_1$ included in the second codebook may be configured according to the codebook design methods described in the above-described various embodiments of the present invention. For example, the first codebook may include one or more diagonal matrices each having N×N size and, in each diagonal matrix, elements other than 0, i.e. main diagonal elements, may have prescribed phase values. For example, the second codebook may include one or more matrices each having N×L size.

The processor 2513 of the transmitter 2510 performs an operation processing function on information received by the transmitter 2510 and information to be transmitted to other devices. The memory 2514 may store the processed information for a given time and may be replaced with an element such as a buffer (not shown).

Referring to FIG. 25, the receiver 2520 according to the present invention may include a reception module 2521, a transmission module 2522, a processor 2523, a memory 2514, and one or more antennas 2525. The receiver 2520 may perform MIMO reception from the transmitter 2510. The reception module 2521 may receive various signals, data, and information from other devices. The transmission module 2522 may transmit various signals, data, and information to other devices. The processor 2523 may control the overall operation of the receiver 2520.

The receiver 2520 according to an exemplary embodiment of the present invention may be configured to receive a codebook-based precoded signal. The memory 2524 of the receiver 2520 may store may store the first and second codebooks. The processor 2523 of the receiver 2520 may be configured to receive, through the reception module 2521, a signal transmitted through N (N≥2) transmit antennas 2515 of the transmitter 2510. In addition, the processor 2523 may be configured to process the received signal. The signal received by the receiver 2520 is a signal upon which precoding has been performed by the transmitter 2510 using the precoding matrix with respect to L layers (1≤L≤N) to which a signal to be transmitted to the receiver 2520 is mapped. The precoding matrix W used by the transmitter may be determined based on the first matrix R selected from the first codebook associated with the first PMI and the second matrix $W_1$ selected from the second codebook associated with the second PMI. Here, candidates of the first matrix R included in the first codebook and candidates of the second matrix $W_1$ included in the second codebook may be configured according to the codebook design methods described in the above-described various embodiments of the present invention. For example, the first codebook may include one or more diagonal matrices each having N×N size and, in each diagonal matrix, elements other than 0, i.e. main diagonal elements, may have prescribed phase values. For example, the second codebook may include one or more matrices each having N×L size.

The processor 2523 of the receiver 2520 performs an operation processing function of information received by the receiver 2520 and information to be transmitted to external devices. The memory 2524 may store the processed information for a given time and may be replaced with an element such as a buffer (not shown).

The detailed configuration of the transmitter and receiver described with reference to FIG. 25 may be implemented such that each of the aforementioned various embodiments of the present invention is independently applied or two or more embodiments of the present invention are simultaneously applied. A repetitive description is omitted for clarity of description.

In the description associated with FIG. 25, the transmitter 2510 may be a BS and the receiver 2520 may be a UE. Alternatively, the transmitter 2510 may be the UE and the receiver 2520 may be the BS. Moreover, the description of the transmitter 2510 may be identically applied to a relay as a downlink transmission entity or an uplink transmission entity and the description of the receiver 2520 may be identically applied to the relay as a downlink reception entity or an uplink reception entity.

The above-described embodiments of the present invention may be achieved by various means, for example, hardware, firmware, software, or a combination thereof.

In a hardware configuration, the methods according to the embodiments of the present invention may be achieved by one or more Application Specific Integrated Circuits (ASICs), Digital Signal Processors (DSPs), Digital Signal Processing Devices (DSDPs), Programmable Logic Devices (PLDs), Field Programmable Gate Arrays (FPGAs), processors, controllers, microcontrollers, microprocessors, etc.

In a firmware or software configuration, the method according to the embodiments of the present invention may be implemented in the form of a module, a procedure, a function, etc. Software code may be stored in a memory unit and executed by a processor. The memory unit is located at the interior or exterior of the processor and may transmit and receive data to and from the processor via various known means.

The detailed description of the exemplary embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. For example, the structures of the above-described embodiments of the present invention can be used in combination. Thus, the present invention is not intended to be limited to the embodiments described, but is to be accorded the broadest scope consistent with the claims appended hereto and the disclosure set forth herein.

The present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. Accordingly, the invention should not be limited to the specific embodiments described herein, but should be accorded the broadest scope consistent with the principles and novel features disclosed herein. In addition, claims that are not explicitly cited in each other in the appended claims may be presented in combination as an embodiment of the present invention or included as a new claim by a subsequent amendment after the application is filed.

INDUSTRIAL APPLICABILITY

The above-described embodiments of the present invention are applicable to various mobile communication systems.

The invention claimed is:

1. A method for transmitting a signal to a receiver through N (N≥2) transmission antennas in a transmitter, comprising:
    selecting a first precoding matrix from a first codebook associated with a first Precoding Matrix Indicator (PMI);
    selecting a second precoding matrix from a second codebook associated with a second PMI;
    determining a precoding matrix by a product of the first precoding matrix and the second precoding matrix;
    performing precoding using the determined precoding matrix with respect to L (1≤L≤N) layers to which a signal to be transmitted to the receiver is mapped; and
    transmitting the precoded signal to the receiver through the N transmission antennas,
    wherein the first precoding matrix is a phase matrix having a N×N size, and elements other than 0 in the phase diagonal matrix have prescribed phase values,
    wherein the second precoding matrix is a matrix having a N×L size.

2. The method of claim 1, wherein, when the number L of the layers is a specific number or more, the first precoding matrix is an identity matrix which has values of 1 for the elements other than 0.

3. The method of claim 2, wherein the specific number of the layers is 2 or more.

4. The method of claim 1, wherein the first codebook includes a plurality of diagonal matrices and one of the plurality of diagonal matrices is an identity matrix.

5. The method of claim 1,
    wherein elements other than 0 in the phase diagonal matrix are composed of one column vector of a prescribed matrix, and
    wherein the prescribed matrix is one of an N-point Discrete Fourier Transform (DFT) matrix, a matrix included in a single codebook, and a matrix determined by a combination of multiple codebooks.

6. The method of claim 1,
    wherein the phase diagonal matrix is determined by a product of a first diagonal matrix of N×N size and a second diagonal matrix of N×N size,
    wherein elements other than 0 of the first diagonal matrix are composed of a column vector of an N-point DFT matrix or a vector concatenating column vector of an N/2-point DFT matrix, and
    wherein elements other than 0 of the second diagonal matrix are composed of one column vector of the N-point DFT matrix or a repetitive form of a prescribed phase value.

7. A method for receiving a signal from a transmitter in a receiver, comprising:
    receiving the signal transmitted through N (N≥2) transmission antennas of the transmitter; and
    processing the received signal, wherein the received signal is a signal upon which precoding has been performed using a precoding matrix with respect to L (1≤L≤N) layers to which a signal to be transmitted to the receiver from the transmitter is mapped, wherein the precoding matrix is determined by a product of a first precoding matrix and a second precoding matrix, wherein the first precoding matrix is selected from a first codebook associated with a first Precoding Matrix Indicator (PMI) and the second precoding matrix is selected from a second codebook associated with a second PMI, wherein the first precoding matrix is a phase matrix having a N×N size, and elements other than 0 in the phase diagonal matrix have prescribed phase values, and wherein the second precoding matrix is a matrix having a N×L size.

8. The method of claim 7, wherein, when the number L of the layers is a specific number or more, the first precoding matrix is an identity matrix which has values of 1 for the elements other than 0.

9. The method of claim 8, wherein the specific number is 2 or more.

10. The method of claim 7, wherein the first codebook includes a plurality of diagonal matrices and one of the plurality of diagonal matrices is an identity matrix.

11. The method of claim 7,
wherein elements other than 0 in the phase diagonal matrix are composed of one column vector of a prescribed matrix, and
wherein the prescribed matrix is one of an N-point Discrete Fourier Transform (DFT) matrix, a matrix included in a single codebook, and a matrix determined by a combination of multiple codebooks.

12. The method of claim 7,
wherein the phase diagonal matrix is determined by a product of a first diagonal matrix of N×N size and a second diagonal matrix of N×N size,
wherein elements other than 0 of the first diagonal matrix are composed of one of one column vector of an N-point DFT matrix or a vector concatenating column vector of an N/2-point DFT matrix, and
wherein elements other than 0 of the second diagonal matrix are composed of one column vector of the N-point DFT matrix or a repetitive form of a prescribed phase value.

13. A transmit device for transmitting a precoded signal, the transmit device comprising:
a transmitter configured to transmit a signal to a receiver;
receiver configured to receive a signal from the receiver;
a memory configured to store first and second codebooks, N (N≥2) transmission antennas; and
a processor configured to the transmitter, wherein the processor is further configured to
select a first precoding matrix from a first codebook associated with a first Precoding Matrix Indicator (PMI);
select a second precoding matrix from a second codebook associated with a second PMI;
determine a precoding matrix by a product of the first precoding matrix and the second precoding matrix;
perform precoding using the determined precoding matrix with respect to L (1≤L≤N) layers to which a signal to be transmitted to the receiver is mapped; and
transmit the precoded signal to the receiver through the N transmission antennas,
wherein the first precoding matrix is a phase matrix having a N×N size, and elements other than 0 in the phase diagonal matrix have prescribed phase values,
wherein the second precoding matrix is a matrix having a N×L size.

14. A receive device for receiving a precoded signal, the receive device comprising:
a transmitter configured to transmit a signal to a transmitter;
a receiver configured to receive a signal from the transmitter;
a memory configured to store first and second codebooks, one or more antennas; and
a processor configured to control the receiver,
wherein the processor is further configured to
receive the signal transmitted through N (N≥2) transmission antennas of the transmitter; and
process the received signal,
wherein the received signal is a signal upon which precoding has been performed using a precoding matrix with respect to L (1≤L≤N) layers to which a signal to be transmitted to the receiver from the transmitter is mapped,
wherein the precoding matrix is determined by a product of a first precoding matrix and a second precoding matrix,
wherein the first precoding matrix is selected from a first codebook associated with a first Precoding Matrix Indicator (PMI) and the second precoding matrix is selected from a second codebook associated with a second PMI,
wherein the first precoding matrix is a phase matrix having a N×N size, and elements other than 0 in the phase diagonal matrix have prescribed phase values, and
wherein the second precoding matrix is a matrix having a N×L size.

* * * * *